(12) United States Patent
Robledo

(10) Patent No.: US 8,678,756 B2
(45) Date of Patent: Mar. 25, 2014

(54) SYSTEM AND METHOD FOR RE-BUILDING A PUMP

(75) Inventor: Jaime Robledo, Sahuarita, AZ (US)

(73) Assignee: Raytheon Company, Waltham, MA (US)

( * ) Notice: Subject to any disclaimer, the term of this patent is extended or adjusted under 35 U.S.C. 154(b) by 854 days.

(21) Appl. No.: 12/701,744

(22) Filed: Feb. 8, 2010

(65) Prior Publication Data

US 2010/0202894 A1    Aug. 12, 2010

Related U.S. Application Data

(60) Provisional application No. 61/151,113, filed on Feb. 9, 2009.

(51) Int. Cl.
*F04D 29/08* (2006.01)
*F04D 29/10* (2006.01)
*F16J 15/34* (2006.01)

(52) U.S. Cl.
USPC ........ 415/171.1; 415/230; 277/366; 277/367; 277/368; 277/369; 277/370; 277/390; 277/393

(58) Field of Classification Search
USPC ............... 415/110, 111, 171.1, 230; 416/174; 277/306, 358, 370, 371, 377, 366–369, 277/390, 393
See application file for complete search history.

(56) References Cited

U.S. PATENT DOCUMENTS

| | | | | |
|---|---|---|---|---|
| 2,406,517 A | * | 8/1946 | Triplett | 48/189.5 |
| 2,885,960 A | * | 5/1959 | Deschamps | 418/26 |
| 4,556,239 A | * | 12/1985 | Eriksson | 384/130 |
| 4,648,794 A | * | 3/1987 | Hunjan et al. | 415/171.1 |
| 5,425,287 A | | 6/1995 | Beattie | |
| 5,509,791 A | * | 4/1996 | Turner | 417/238 |
| 5,713,576 A | * | 2/1998 | Wasser et al. | 277/304 |
| 6,139,256 A | | 10/2000 | Freeman et al. | |
| 6,142,478 A | * | 11/2000 | Pecht et al. | 277/400 |
| 6,371,488 B1 | * | 4/2002 | Szymborski et al. | 277/365 |
| 6,659,737 B2 | * | 12/2003 | Bader et al. | 417/366 |
| 2002/0079647 A1 | * | 6/2002 | Theodore, Jr. | 277/399 |

FOREIGN PATENT DOCUMENTS

| | | | | |
|---|---|---|---|---|
| EP | 0 864 787 A2 | 9/1998 | | F16J 15/34 |
| EP | 1 213 516 A1 | 6/2002 | | F16J 15/34 |
| EP | 1213516 A1 | * 6/2002 | | F16J 15/34 |
| WO | WO 2004/008007 A1 | 1/2004 | | F16J 15/34 |
| WO | WO 2007/146749 A2 | 12/2007 | | |

OTHER PUBLICATIONS

EP 1213516: Foreign reference, Abstract Translation, Description Translation.*

(Continued)

*Primary Examiner* — Nathaniel Wiehe
*Assistant Examiner* — Su Htay
(74) *Attorney, Agent, or Firm* — Daly, Crowley, Mofford & Durkee, LLP

(57) ABSTRACT

In accordance with one embodiment of the present disclosure, a method may include installing a first seal around a motor shaft. The method may also include installing a second seal around the motor shaft, wherein the second seal and the first seal may form a hydrodynamic seal when the motor shaft rotates. The method may further include installing a spacer in-between the second seal and the first seal.

20 Claims, 15 Drawing Sheets

(56) References Cited

OTHER PUBLICATIONS

EP 1213516: (Jun. 2002) Foreign reference, Abstract Translation, Description Translation.*
PCT Notification of Transmittal of the International Search Report and the Written Opinion of the International Searching Authority, or the Declaration mailed May 5, 2010, regarding international application PCT/US2010/023572 filed Sep. 2, 2010.
International Preliminary Report on Patentability, PCT/US2010/023572, Aug. 9, 2011, 1 page.
Written Opinion of the international Searching Authority, PCT/US2010/023572, Aug. 9, 2011, 7 pages.

* cited by examiner

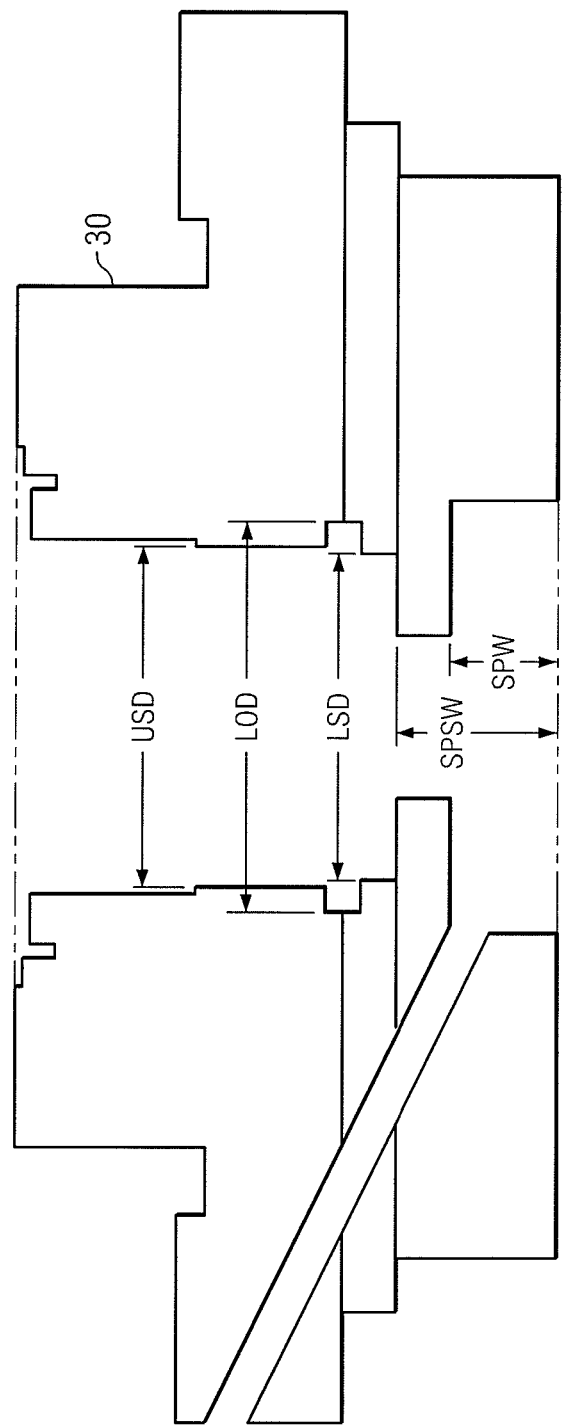

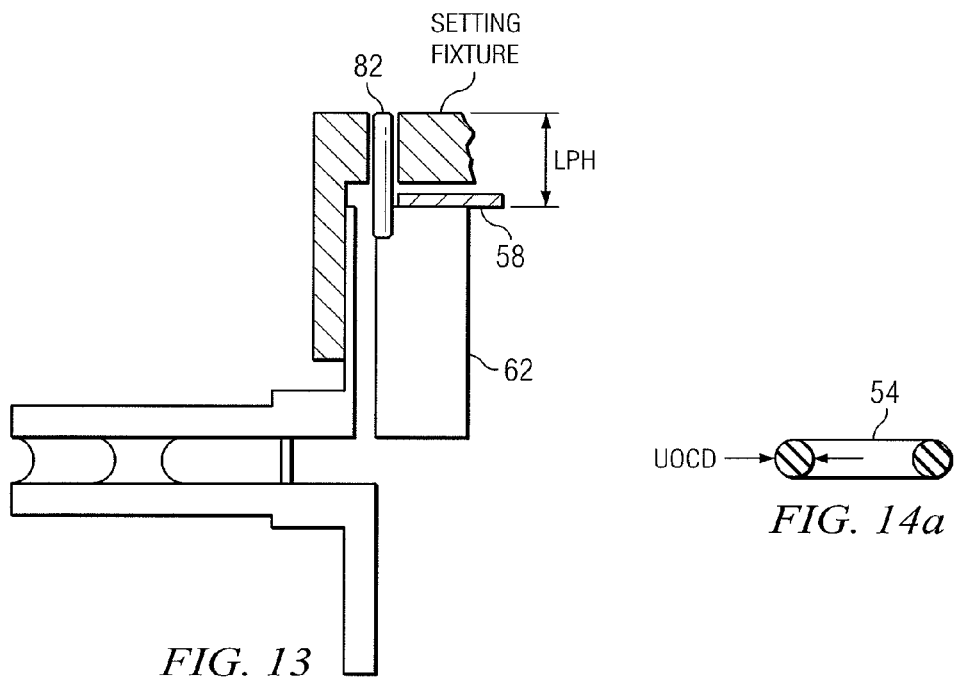
FIG. 13
FIG. 14a
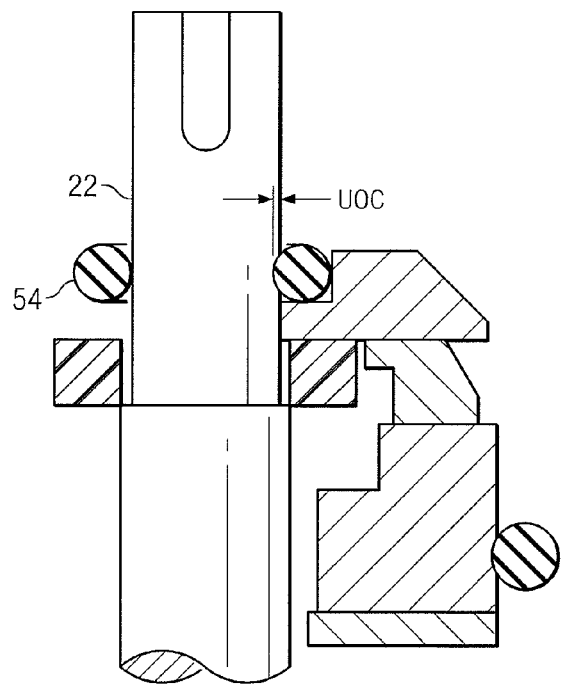
FIG. 14b

SYSTEM AND METHOD FOR RE-BUILDING A PUMP

RELATED APPLICATION

Pursuant to 35 U.S.C. §119(e), this application claims priority to U.S. Provisional Patent Application Ser. No. 61/151,113, entitled PUMP REBUILD PROCEDURE, filed Feb. 9, 2009. U.S. Provisional Patent Application Ser. No. 61/151,113 is hereby incorporated by reference.

TECHNICAL FIELD

The present disclosure relates generally to pumps and more particularly to a system and method for re-building a pump.

BACKGROUND

Typically, a pump includes a seal for preventing coolant from contacting the pump's motor. The cooling liquid electron tube (CLET) pump for the radar system for the Patriot missile system includes such a seal. Such seals, however, are deficient.

SUMMARY

In accordance with one embodiment of the present disclosure, a method may include installing a first seal around a motor shaft. The method may also include installing a second seal around the motor shaft, wherein the second seal and the first seal may form a hydrodynamic seal when the motor shaft rotates. The method may further include installing a spacer in-between the second seal and the first seal.

Numerous technical advantages are provided according to various embodiments of the present disclosure. Particular embodiments of the disclosure may exhibit none, some, or all of the following advantages depending on the implementation. In certain embodiments, a spacer may be installed in-between a first seal and a second seal. As such, the spacer may dampen the vibrations emanating from the motor shaft. Accordingly, the second seal may be able to form a better hydrodynamic seal with the first seal, thereby minimizing coolant leakage.

In another embodiment, one or more shims may be installed around the motor shaft. As such, the shims may be able to compensate for various manufacturing inconsistencies in the elements of the pump system. Accordingly, coolant leakage may be minimized.

In another embodiment, a first high temperature o-ring and a second high temperature o-ring may be installed around the motor shaft. By installing high temperature o-rings, the o-rings may be able to withstand the temperatures inside the pump system. Accordingly, coolant leakage may be minimized.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following descriptions, taken in conjunction with the accompanying drawings, in which:

FIGS. 2-17 illustrate particular embodiments of various calculations and installation steps for the pump system of FIG. 1.

DETAILED DESCRIPTION OF EXAMPLE EMBODIMENTS

It should be understood at the outset that, although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

Figure 1:
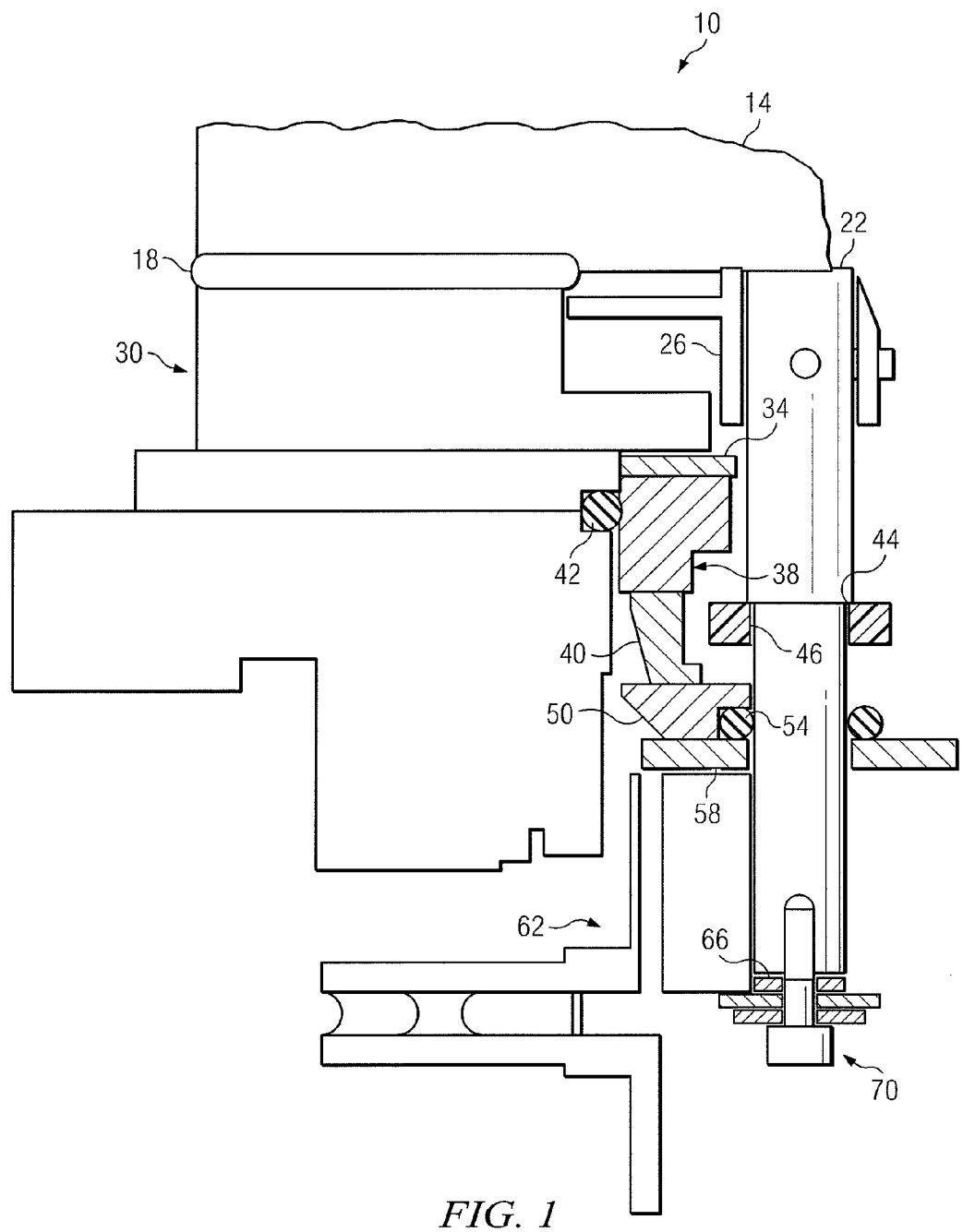
FIG. 1 is a two-dimensional cut-out diagram illustrating one embodiment of a pump system for pumping a coolant from a pump manifold well in order to be used to cool another system.

FIG. 1 is a two-dimensional cut-out diagram illustrating one embodiment of a pump system 10 for pumping a coolant from a pump manifold well in order to be used to cool another system. In one embodiment, the pump system 10 may include a spacer 46 located in-between a first seal 38 and a second seal 50. As such, the spacer 46 may dampen vibrations emanating from a motor shaft 22 as it rotates, allowing the first seal 38 and second seal 50 to form a better hydrodynamic seal. Accordingly, coolant leakage may be minimized. In another embodiment, the pump system 10 may further include one or more shims that may compensate for various height differences throughout the pump system 10. Accordingly, coolant leakage may be further minimized. Furthermore, the pump system 10 may operate for a longer period.

As is discussed above, FIG. 1 is a two-dimensional cut-out diagram illustrating one embodiment of the pump system 10. In order to provide a simplified view of the pump system 10, various elements of the pump system 10 may be illustrated as only being located on a single side of the motor shaft 22, even though these elements may completely or partially surround the entire motor shaft 22. For example, although the housing 30 is illustrated as only being located on one side of the motor shaft 22, the housing 30, in one embodiment, may completely or partially surround the motor shaft 22.

The pump system 10 may include any suitable pump system for pumping coolant from a pump manifold well in order to be used to cool another system. In one embodiment, the pump system may include a cooling liquid electron tube (CLET) pump. For example, the pump system 10 may be a CLET pump for a radar system for a Patriot missile system. As such, the pump system 10 may pump coolant from a pump manifold well in order to be used to cool components of the radar system of the Patriot missile system. In further embodiments, the pump system 10 may include any other suitable pump system. For example, the pump system 10 may pump coolant in order to be used to cool an automobile engine, an oil rig motor, or any other suitable device that generates heat. In a further embodiment, the pump system 10 may include any suitable pump system for pumping coolant in order to be used with another system. For example, the coolant may be used by the other system for any suitable purpose. In such an example, the pump system 10 may pump the coolant so that the coolant may be used by the other system as, for example, a lubricant, an additive for a product, fuel for operation, or any other suitable purpose that may require a coolant.

In one embodiment, the coolant pumped by the pump system 10 may include any suitable coolant. For example, the coolant may include any suitable coolant for cooling a radar system of a Patriot missile system, an automobile engine, an oil rig motor, or any other suitable device that generates heat. In one embodiment, the coolant may include Ethylene Glycol. In another embodiment, the coolant may include any other suitable liquid. For example, the coolant may include water, oil, any other suitable liquid, or any combination of liquids. In a further embodiment, the coolant may include any other suitable liquid that may be used by another system.

According to the illustrated embodiment, the pump system 10 includes a motor 14, a first shim 18, the motor shaft 22, a slush plate 26, the housing 30, a second shim 34, the first seal 38, a first high temperature o-ring 42, the spacer 46, the second seal 50, a second high temperature o-ring 54, a third shim 58, an impeller 62, a fourth shim 66, and mounting hardware 70.

The motor 14 may include any device that causes the motor shaft 22 to rotate. For example, the motor 14 may include any suitable rotary device that may create a rotational force. In one embodiment, the motor 14 may include any suitable rotary device for use in a CLET pump for a radar system for a Patriot missile system. In another embodiment, the motor 14 may include any other suitable rotary device. For example, the motor 14 may be a rotary device for a pump that provides coolants to an automobile engine, an oil rig motor, or any other suitable device that generates heat. In one embodiment, the motor 14 may include a rotary device of any suitable size and any suitable power for causing the motor shaft 22 to rotate so that the coolant (not shown) may be pumped up from the pump manifold well (not shown) into the housing 30. In one embodiment, the motor 14 may cause the motor shaft 22 to rotate at any suitable speed. For example, the motor 14 may cause the motor shaft 22 to rotate at 1,000 revolutions per minute (rpm), 1,500 rpm, 2,000 rpm, 2,500 rpm, or any other suitable rpm.

The first shim 18 may include any suitable element for altering the vertical location of the housing 30. In one embodiment, the first shim 18 may include any suitable shim for use in a CLET pump for a radar system for a Patriot missile system. In another embodiment, the first shim 18 may include any other shim. For example, the first shim 18 may be a shim for a pump that provides coolants to an automobile engine, an oil rig motor, or any other suitable device that generates heat. In one embodiment, the first shim 18 may be installed in-between the housing 30 and the motor 14. In such an embodiment, the first shim 18 may alter the vertical location of the housing 30 in order to compensate for height differences in the motor shaft 22. For example, manufacturing inconsistencies may have caused the motor shaft 22 to be too tall with regard to the housing 30. In such an example, the first shim 18 may lower the location of the housing 30, causing the housing 30 to more properly fit the motor shaft 22. In one embodiment, the first shim 18 may include any suitable size, shape, or material type. In a further embodiment, the size of the first shim 18 may be calculated, as is discussed in FIG. 6. In one embodiment, the size of the first shim 18 may refer to the thickness of the first shim 18.

The motor shaft 22 may include any device that may be rotated in order to cause coolant to be pumped into the housing 30 so that it may be provided to another system. In one embodiment, the motor shaft 22 may include any suitable motor shaft for use in a CLET pump for a radar system for a Patriot missile system. In another embodiment, the motor shaft 22 may include any other suitable motor shaft. For example, the motor shaft 22 may be a motor shaft for a pump that provides coolants to an automobile engine, an oil rig motor, or any other suitable device that generates heat. In one embodiment, the motor shaft 22 may be rotated at any suitable rpm, as is discussed above.

The slush plate 26 may include any suitable device that surrounds or partially surrounds the motor shaft 22. In one embodiment, the slush plate 26 may include any suitable slush plate for use in a CLET pump for a radar system for a Patriot missile system. In another embodiment, the slush plate 26 may include any other suitable slush plate. For example, the slush plate 26 may be a slush plate for a pump that provides coolants to an automobile engine, an oil rig motor, or any other suitable device that generates heat. In one embodiment, the slush plate 26 may include any suitable size, any suitable shape, and any suitable material type.

The housing 30 may include any suitable device for surrounding the motor shaft 22. In one embodiment, the housing 30 may include any suitable housing for use in a CLET pump for a radar system for a Patriot missile system. In another embodiment, the housing 30 may include any other suitable housing. For example, the housing 30 may be a housing for a pump that provides coolants to an automobile engine, an oil rig motor, or any other suitable device that generates heat. In one embodiment, the housing 30 may further provide a channel around the motor shaft 22 for enclosing any amount of the coolant that is pumped up into the housing 30 by the pump system 10. In a further embodiment, the housing 30 may include one or more exit areas (shown in FIG. 17) that allow the coolant to exit the housing 30 in order to be provided to another system. In a further embodiment, the housing 30 may further include a leakage shaft (shown in FIG. 3) that may allow any coolant that leaks past the first seal 38 to exit the housing 30. As such, the coolant may exit the housing 30 prior to coming in contact with the motor 14.

The second shim 34 may include any suitable element for altering the vertical location of the first seal 38 or the spacer 46. In one embodiment, the second shim 34 may include any suitable shim for use in a CLET pump for a radar system for a Patriot missile system. In another embodiment, the second shim 34 may include any other suitable shim. For example, the second shim 34 may be a shim for a pump that provides coolants to an automobile engine, an oil rig motor, or any other suitable device that generates heat.

Figure 9:
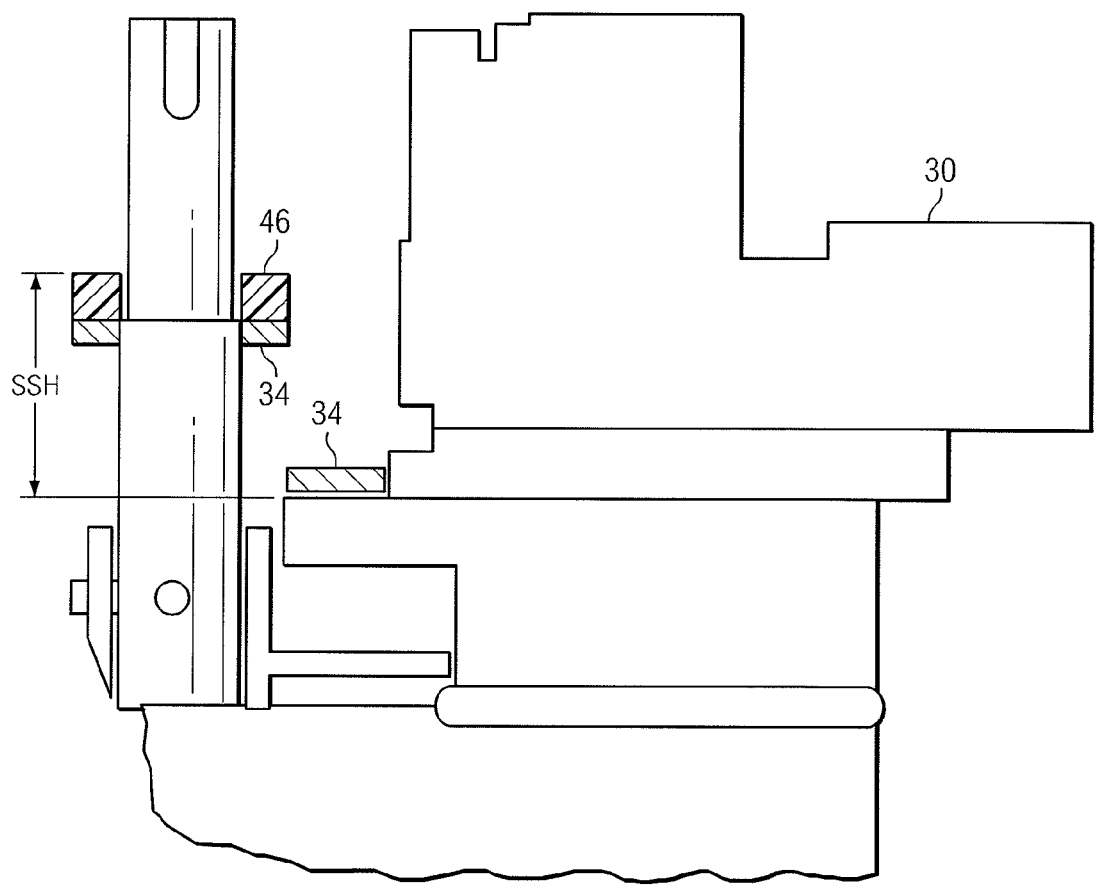

In one embodiment, the second shim 34 may be installed in-between the housing 30 and the first seal 38 in order to vertically displace the first seal 38 in relation to the spacer 46, as is illustrated in FIG. 1. In another embodiment, the second shim 34 may be installed in-between the spacer 46 and a shoulder 44 of the motor shaft 22 in order to vertically displace the spacer 46 in relation to the first seal 38, as is illustrated in FIG. 9. According to one embodiment, the second shim 34 may alter the vertical location of the first seal 38 or the spacer 46 in order to compensate for height differences in the pump system 10. For example, manufacturing inconsistencies may have caused the various elements of the pump system 10 to be bigger than originally designed for. In one embodiment, such inconsistencies may cause the first seal 38 and the second seal 50 to form a hydrodynamic seal that may leak. In one embodiment, altering the vertical location of either the first seal 38 or the spacer 46 may cause the first seal 38 and the second seal 50 to form a better hydrodynamic seal. As such, coolant leakage may be minimized. In one embodiment, the second shim 34 may include any suitable size, shape, or material type. In a further embodiment, the size of the second shim 34 may be calculated, as is discussed in FIG. 9. In another embodiment, the location where the second shim 34 is installed in the pump system 10 may also be calculated, as is discussed in FIG. 9. In one embodiment, the size of the second shim 34 may refer to the thickness of the second shim 34.

The first seal 38 may include any device that may form a hydrodynamic seal with the second seal 50. In one embodiment, the first seal 38 may include any suitable seal for use in a CLET pump for a radar system for a Patriot missile system. In another embodiment, the first seal 38 may include any other suitable seal. For example, the first seal 38 may be a seal for a pump that provides coolants to an automobile engine, an oil rig motor, or any other suitable device that generates heat. In one embodiment, the first seal 38 may include a contractible portion 40 that may contract in order to form the hydrodynamic seal with the second seal 50. In one embodiment, the contractible portion 40 may contract when the pump system 10 is loaded. In one embodiment, the contractible portion 40 may include any suitable contractible material type. For example, the contractible portion 40 may include a carbon based element coupled to contractible springs.

The first high temperature o-ring 42 may include any suitable o-ring. In one embodiment, the first high temperature o-ring 42 may include any suitable o-ring for use in a CLET pump for a radar system for a Patriot missile system. In another embodiment, the first high temperature o-ring 42 may include any other suitable o-ring. For example, the first high temperature o-ring 42 may be an o-ring for a pump that provides coolants to an automobile engine, an oil rig motor, or any other suitable device that generates heat. In one embodiment, the first high temperature o-ring 42 may include any suitable high temperature material. For example, the first high temperature o-ring 42 may include a material that may be used in a temperature range of 300 to 400° Fahrenheit. In such an example, the first high temperature o-ring 42 may include VITON®. In one embodiment, the first high temperature o-ring 42 may be installed in-between the housing 30 and the first seal 38, as is illustrated in FIG. 1. In one embodiment, the first high temperature o-ring 42 may be installed in the pump system 10 after being lubricated first. For example, the first high temperature o-ring 42 may be lubricated with any suitable barium based petroleum grease, such as Parker grease.

The spacer 46 may include any suitable device for dampening vibrations from the motor shaft 22 while the motor shaft 22 is being rotated. In one embodiment, the spacer 46 may include any suitable spacer for use in a CLET pump for a radar system for a Patriot missile system. In another embodiment, the spacer 46 may include any other suitable spacer. For example, the spacer 46 may be a spacer for a pump that provides coolants to an automobile engine, an oil rig motor, or any other suitable device that generates heat. In one embodiment, the spacer 46 may include any suitable material type. For example, the spacer 46 may include a synthetic polymer, such as TEFLON®. In one embodiment, the spacer 46 may be installed around the motor shaft 22 at the shoulder 44 of the motor shaft 22. In one embodiment, by installing the spacer 46 at the shoulder 44 of the motor shaft 22, the spacer 46 may dampen the vibrations emanating from the motor shaft 22. In one embodiment, by dampening the vibrations, the second seal 50 may be able to create a better hydrodynamic seal with the first seal 38. As such, coolant leakage may be minimized.

The second seal 50 may include any device that may form a hydrodynamic seal with the first seal 38. In one embodiment, the second seal 50 may include any suitable seal for use in a CLET pump for a radar system for a Patriot missile system. In another embodiment, the second seal 50 may include any other suitable seal. For example, the second seal 50 may be a seal for a pump that provides coolants to an automobile engine, an oil rig motor, or any other suitable device that generates heat. In one embodiment, the second seal 50 may be lubricated prior to being installed around the motor shaft 22. For example, a molybdenum grease, such as MOLYKOTE® grease, may be applied to an area of the second seal 50 that may contact the first seal 38. In one embodiment, the molybdenum grease may be applied to an area of the second seal that may contact the contractible portion 40 of the first seal 38 while forming a hydrodynamic seal. In another embodiment, the second seal 50 may be rotated. For example, the rotation of the motor shaft 22 may cause the second seal 50 to rotate also. In one embodiment, the high speed rotation of the second seal 50 may allow the second seal 50 to form a hydrodynamic seal with the first seal 38.

The second high temperature o-ring 54 may include any suitable o-ring. In one embodiment, the second high temperature o-ring 54 may include any suitable o-ring for use in a CLET pump for a radar system for a Patriot missile system. In another embodiment, the second high temperature o-ring 54 may include any other suitable o-ring. For example, the second high temperature o-ring 54 may be an o-ring for a pump that provides coolants to an automobile engine, an oil rig motor, or any other suitable device that generates heat. In one embodiment, the second high temperature o-ring 54 may include any suitable high temperature material. For example, the second high temperature o-ring 54 may include a material that may be used in a temperature range of 300 to 400° Fahrenheit. In such an example, the second high temperature o-ring 54 may include VITON®. In one embodiment, the second high temperature o-ring 54 may be installed in-between the second seal 50 and the third shim 58, as is illustrated in FIG. 1. In one embodiment, the second high temperature o-ring 54 may be installed in the pump system 10 after being lubricated first. For example, the second high temperature o-ring 54 may be lubricated with any suitable barium based petroleum grease, such as Parker grease.

The third shim 58 may include any suitable element for altering the vertical location of the impeller 62. In one embodiment, the third shim 58 may include any suitable shim for use in a CLET pump for a radar system for a Patriot missile system. In another embodiment, the third shim 58 may include any other suitable shim. For example, the third shim 58 may be a shim for a pump that provides coolants to an automobile engine, an oil rig motor, or any other suitable device that generates heat.

In one embodiment, the third shim 58 may be installed in-between the second seal 50 and the impeller 62 in order to vertically displace the impeller 62, as is illustrated in FIG. 1. In one embodiment, by vertically displacing the impeller 62, the third shim 58 may allow the pump system 10 to compensate for height differences in the pump system 10. For example, manufacturing inconsistencies may have caused various elements of the pump system 10 to be bigger than originally designed for. In one embodiment, if the impeller 62 is not vertically displaced enough (e.g., lowered in FIG. 1), the impeller 62 may not properly pump the coolant into the housing 30. In a further embodiment, if the impeller 62 is vertically displaced too much, the impeller 62 may run into the bottom of the pump manifold well (not shown) while operating, causing the impeller 62 to be damaged. In one embodiment, the third shim 58 may include any suitable size, shape, or material type. In a further embodiment, the size of the third shim 58 may be calculated, as is discussed in FIG. 12. In one embodiment, the size of the third shim 58 may refer to the thickness of the third shim 58.

The impeller 62 may include any suitable device for pumping coolant into the housing 30. In a further embodiment, the impeller 62 may further cause the coolant to exit the housing 30 through one or more exit passages (shown in FIG. 17) so that the coolant may be used to cool another system. In one embodiment, the impeller 62 may include any suitable impeller for use in a CLET pump for a radar system for a Patriot missile system. In another embodiment, the impeller 62 may include any other suitable impeller. For example, the impeller 62 may be an impeller for a pump that provides coolants to an automobile engine, an oil rig motor, or any other suitable device that generates heat. In one embodiment, the impeller 62 may be rotated by the motor shaft 22 and the motor 14. In such an embodiment, the impeller 62 may create a pressure differential in the coolant in the pump manifold well, causing the coolant to be pumped up from the pump manifold well, through one or more holes (not shown) in the impeller 62, and into the housing 30.

The fourth shim 66 may include any suitable element for preloading the second seal 50 and the first seal 38 of the pump system 10. In one embodiment, the fourth shim 66 may include any suitable shim for use in a CLET pump for a radar system for a Patriot missile system. In another embodiment, the fourth shim 66 may include any other suitable shim. For example, the fourth shim 66 may be a shim for a pump that provides coolants to an automobile engine, an oil rig motor, or any other suitable device that generates heat. In one embodiment, the fourth shim 66 may be installed in-between the motor shaft 22 and the mounting hardware 70, as is illustrated in FIG. 1. In one embodiment, by preloading the second seal 50 and the first seal 38 of the pump system 10, pressure may be applied to the second seal 50 and the first seal 38. According to one embodiment, the pressure may cause the contractible portion 40 of the first seal 38 to contract, causing the first seal 38 and the second seal 50 to form a better hydrodynamic seal. As such, coolant leakage may be minimized. In another embodiment, the fourth shim 66 may further alter the vertical location of the impeller 62. In one embodiment, the fourth shim 66 may include any suitable size, shape, or material type. In a further embodiment, the size of the fourth shim 66 may be calculated, as is discussed in FIG. 15B. In one embodiment, the size of the fourth shim 66 may refer to the thickness of the fourth shim 66.

The mounting hardware 70 may include any suitable device for coupling the impeller 62 to the motor shaft 22. In one embodiment, the mounting hardware 70 may include any suitable mounting hardware for use in a CLET pump for a radar system for a Patriot missile system. In another embodiment, the mounting hardware 70 may include any other suitable mounting hardware. For example, the mounting hardware 70 may be mounting hardware for a pump that provides coolants to an automobile engine, an oil rig motor, or any other suitable device that generates heat.

As is discussed above, FIG. 1 illustrates one embodiment of the pump system 10. In one embodiment, the pump system 10 may be a system that is re-built from a prior system. For example, in an embodiment where the pump system 10 pumps coolant for a radar system of a Patriot missile system, the radar system may already have a pre-existing pump system. As such, in one embodiment, the pump system 10 may include a re-built version of this pump system. In a further embodiment, the pump system 10 may include an entirely new pump system. For example, the pump system 10 may be built from scratch.

Although FIG. 1 includes four different shims (e.g., first shim 18, second shim 34, third shim 58, and fourth shim 66), the pump system 10 may include any other suitable number of shims. For example, the pump system 10 may include fewer than four shims, or more than four shims. For example, in an embodiment where the motor shaft 22 is manufactured to its designed height, the pump system 10 may not include the first shim 18. As such, the housing 30 may not be vertically displaced in relation to the motor shaft 22. In a further embodiment, although FIG. 1 illustrates the four shims located in particular locations of the pump system 10, in further embodiments, the shims may be located in any other suitable locations in order to compensate for various manufacturing inconsistencies.

Modifications, additions, or omissions may be made to the pump system 10 without departing from the scope of the invention. The components of the pump system 10 may be integrated or separated. Moreover, the operations of the pump system 10 may be performed by more, fewer, or other components. For example, the operations of the spacer 46 may be performed by more than one component. As used in this document, "each" refers to each member of a set or each member of a subset of a set.

FIGS. 2-17 illustrate particular embodiments of various calculations and installation steps for the pump system 10 of FIG. 1.

Figure 2:
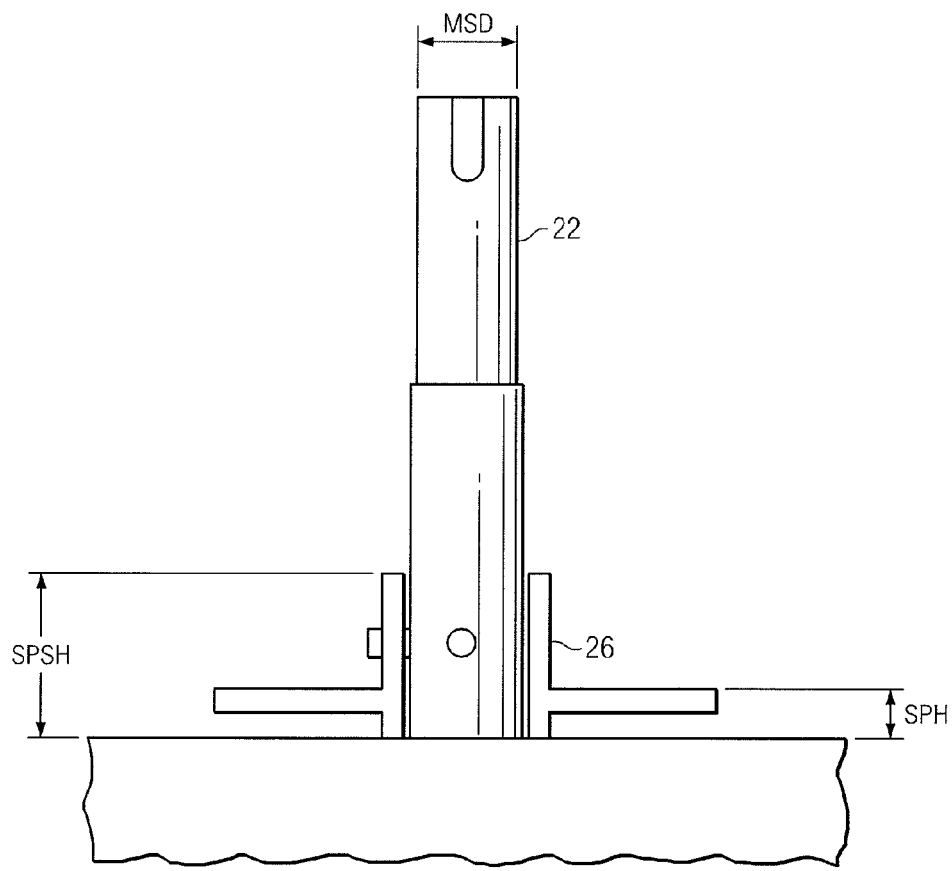
Figure 6:
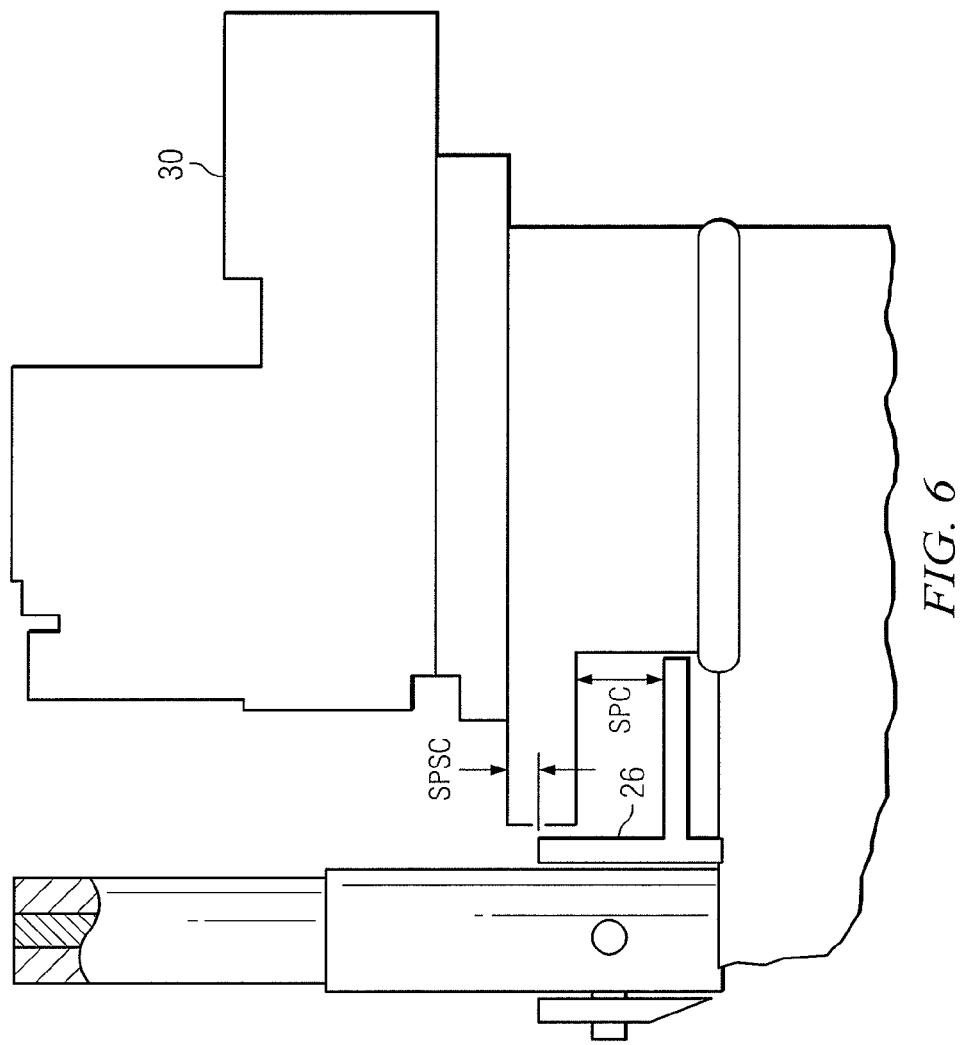

FIG. 2 illustrates particular embodiments for measuring the motor shaft 22 and the slush plate 26. In one embodiment, the slush plate height (SPH) of the slush plate 26 is measured, as is illustrated. In one embodiment, the SPH may be used to calculate the size of the first shim 18, as is discussed in FIG. 6. In another embodiment, the slush plate shoulder (SPSH) of the slush plate 26 is measured, as is illustrated. According to one embodiment, the SPSH may be used to calculate the size of the first shim 18, as is illustrated in FIG. 6. In a further embodiment, the motor shaft diameter (MSD) of the motor shaft 22 is measured, as is illustrated. In one embodiment, the MSD may be used to select the second high temperature o-ring 54, as is illustrated in FIG. 14B.

In a further embodiment, the motor shaft 22 may be inspected for one or more scratches. In one embodiment, the scratches may be polished out using sandpaper. For example, the scratches may be polished out using any suitable sandpaper grit, such as, for example, 800, 1000, 1500, or any other suitable sandpaper grit. In a further embodiment, if the motor shaft 22 exhibits excessive scratches, a different motor shaft 22 may be selected for the pump system 10.

FIG. 3 illustrates particular embodiments for measuring the housing 30. In one embodiment, the slush plate well (SPW) of the housing 30 is measured, as is illustrated. In one embodiment, the SPW may be used to calculate the size of the first shim 18, as is illustrated in FIG. 6. In a further embodiment, the slush plate shoulder well (SPSW) of the housing 30 is measured, as is illustrated. In one embodiment, the SPSW may be used to calculate the size of the first shim 18, as is illustrated in FIG. 6.

Figure 4A:
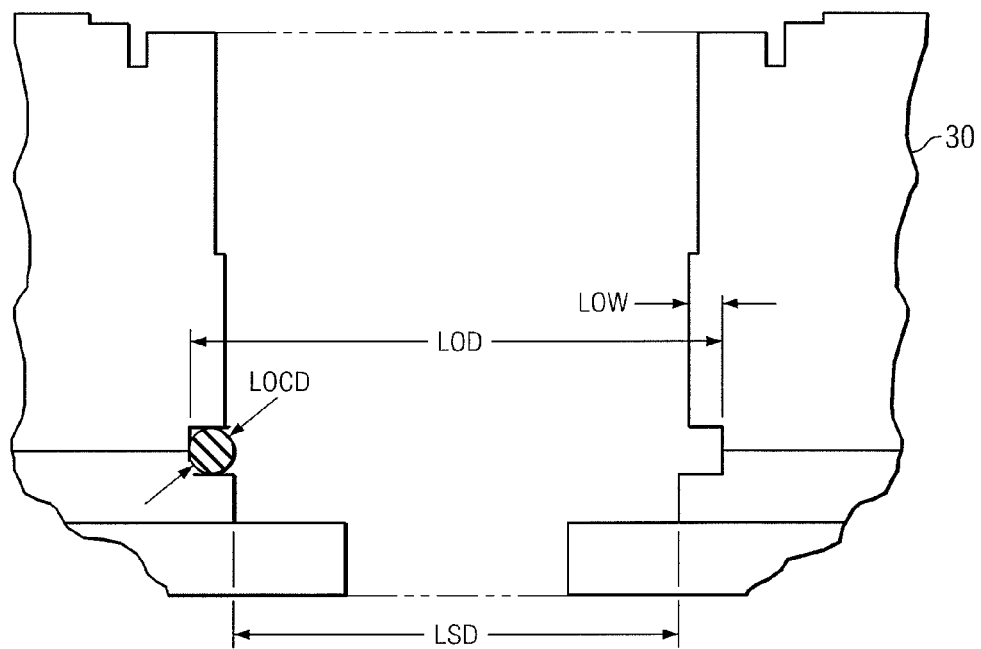

In one embodiment, the lower seal diameter (LSD) of the housing 30 is measured, as is illustrated. In one embodiment, the LSD may be used to select the first high temperature o-ring 42, as is illustrated in FIG. 4A. In another embodiment, the lower o-ring diameter (LOD) of the housing 30 is measured, as is illustrated. In one embodiment, the LOD may be used to select the first high temperature o-ring 42, as is illustrated in FIG. 4A. In another embodiment, the upper seal diameter (USD) of the housing 30 is measured, as is illustrated. In one embodiment, the USD may be used to select the first seal 38.

In one embodiment, the housing 30 may be inspected for scratches. In one embodiment, any scratches may be polished using a buffer wheel. In a further embodiment, if the housing 30 exhibits excessive scratches, a different housing 30 may be selected for use in the pump system 10.

FIG. 4A illustrates particular embodiments for measuring the housing 30. In one embodiment, the lower o-ring well (LOW) of the housing 30 is calculated. In one embodiment, the LOW is calculated using the LOD of FIG. 3 and the LSD of FIG. 3. In one embodiment, the LOW may be calculated using the following formula:

$$LOW=(LOD-LSD)/2$$

Figure 5:
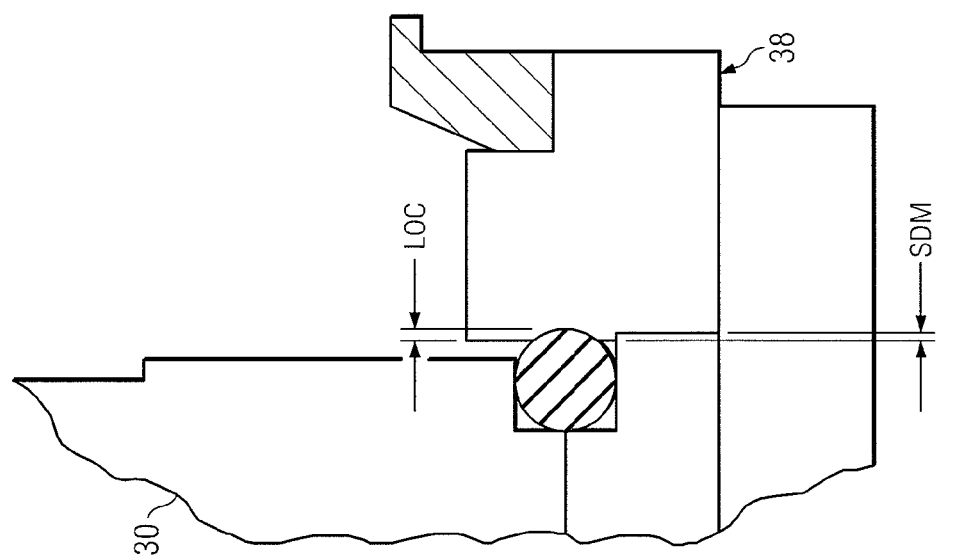

In one embodiment, the LOW may be used to select the first high temperature o-ring 42, as is illustrated in FIG. 5. In another embodiment, the lower seal cross sectional diameter (LOCD) of the housing 30 may be measured, as is illustrated. In one embodiment, the LOCD may be use to select the first high temperature o-ring 42, as is illustrated in FIG. 5.

Figure 4B:
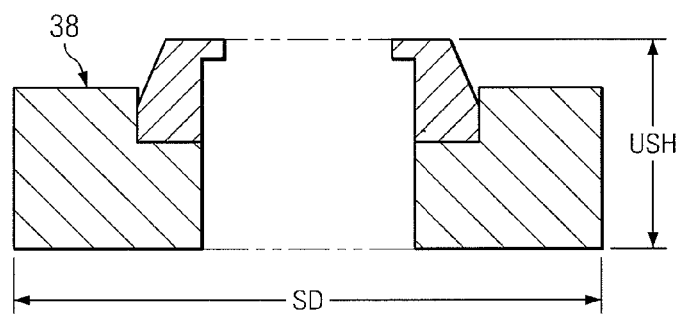

FIG. 4B illustrates particular embodiments for measuring the first seal 38. In one embodiment, the seal diameter (SD) of the first seal 38 is measured, as is illustrated. In one embodiment, the SD may be used to select the first high temperature o-ring 42, as is illustrated in FIG. 5. In another embodiment, the unloaded seal height (USH) of the first seal 38 is measured, as is illustrated. In one embodiment, the USH may be used to calculate the size of the second shim 34, as is illustrated in FIG. 9.

In one embodiment, the first seal 38 may be inspected for scratches and cracks. In one embodiment, any scratches may be polished. In a further embodiment, if the first seal 38 exhibits cracks or excessive scratches, a different first seal 38 may be selected for use in the pump system 10.

FIG. 5 illustrates particular embodiments for measuring the housing 30, the first high temperature o-ring 42, and the first seal 38. In one embodiment, the lower o-ring compression (LOC) for the first high temperature o-ring 42 is calculated. In one embodiment, the LOC may be calculated using the LOCD of FIG. 4A and the LOW of FIG. 4A. In one embodiment, the LOC may be calculated using the following formula:

$$LOC=LOCD-LOW$$

In one embodiment, the LOC may be used to select the first high temperature o-ring 42. For example, in one embodiment, if the LOC is in-between 0.010 inches through 0.017 inches, that particular first high temperature o-ring 42 may be used. As another example, if the LOC is less than 0.010 inches or greater than 0.017 inches, that particular first high temperature o-ring 42 may be exchanged for a first high temperature o-ring 42 that is in-between such measurements. Accordingly, a proper first high temperature o-ring 42 may be selected for the pump system 10.

In another embodiment, the seal diameter modification (SDM) of the first seal 38 is calculated. In one embodiment, the SDM may be calculated using the LSD of FIG. 3 and the SD of FIG. 4B. In one embodiment, the SDM may be calculated using the following formula:

$$SDM=LSD-SD$$

In one embodiment, the SDM may be used to select the first seal 38. For example, if the SDM is within the range of approximately −0.0005 inches to 0.0000 inches, that first seal 38 may be used in the pump system 10. As another example, if the SDM does not fall within this approximate range, the SD of the first seal 38, as is discussed in FIG. 4B, may be modified so that the SDM is within the range of approximately −0.0005 inches to 0.0000 inches.

FIG. 6 illustrates particular embodiments for determining the size of the first shim 18. In one embodiment, the slush plate clearance (SPC) between the slush plate 26 and the housing 30 is calculated. In one embodiment, the SPC may be calculated using the SPW of FIG. 3 and the SPH of FIG. 2. In one embodiment, the SPC may be calculated using the following formula:

$$SPC=SPW-SPH$$

In another embodiment, the slush plate shoulder clearance (SPSC) between the slush plate 26 and the housing 30 is calculated. In one embodiment, the SPSC is calculated using the SPSW of FIG. 3 and the SPSH of FIG. 2. In one embodiment, the SPSC may be calculated using the following formula:

$$SPSC=SPSW-SPSH$$

In one embodiment, the SPC and the SPSC may be used to calculate the size of the first shim 18. For example, in one embodiment, if each of the SPC and the SPSC are greater than or equal to 0.005 inches, the first shim 18 may not be needed in the pump system 10 at all. As such, it may not be installed. In another example, if either the SPC or the SPSC are less than 0.005 inches, a first shim 18 having a size that causes both the SPC and the SPSC to be greater than or equal to 0.005 inches may be installed in-between the housing 30 and the motor 14 of the pump system 10. In another embodiment, if it is not possible for the first shim 18 to cause the SPC and the SPSC to be greater than or equal to 0.005 inches, the motor 14 and/or the housing 30 may not be used in the pump system 10.

Figure 7A:
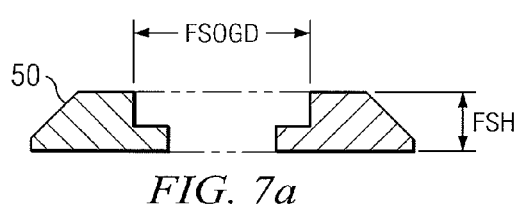
Figure 12:
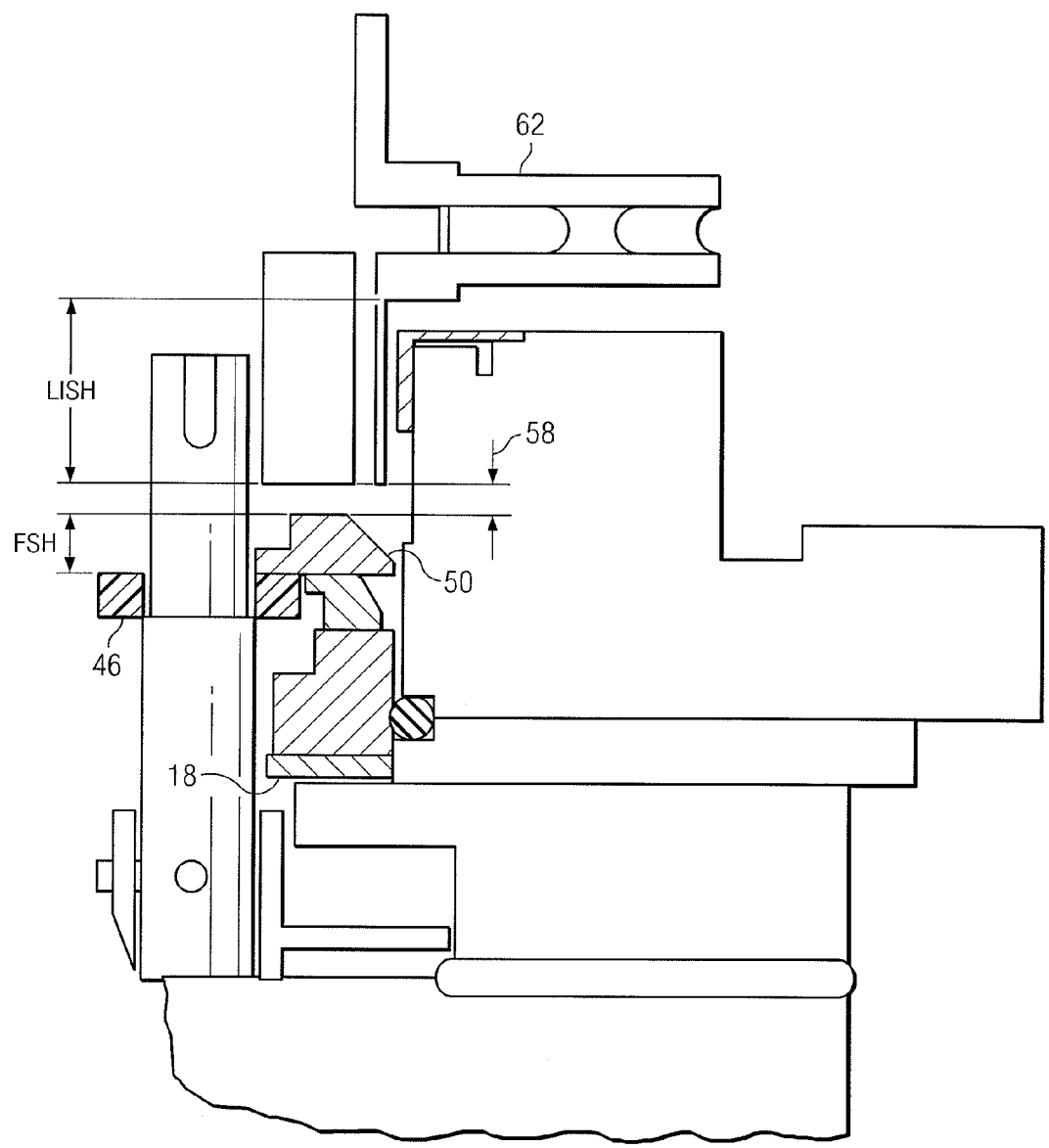

FIG. 7A illustrates particular embodiments for measuring the second seal 50. In one embodiment, the face seal height (FSH) of the second seal 50 is measured, as is illustrated. In one embodiment, the FSH may be used to calculate the size of the third shim 58, as is illustrated in FIG. 12. In another embodiment, the face seal o-ring groove diameter (FSOGD) of the second seal 50 is measured, as is illustrated. In one embodiment, the FSOGD may be used to select the second high temperature o-ring 54, as is illustrated in FIG. 14B.

In one embodiment, the second seal 50 may be inspected for scratches and cracks. In one embodiment, any scratches may be polished. In a further embodiment, if the second seal 50 exhibits cracks or excessive scratches, a different second seal 50 may be selected for use in the pump system 10.

Figure 7B:
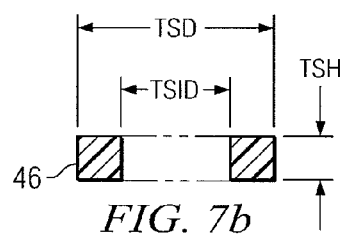

FIG. 7B illustrates particular embodiments for measuring the spacer 46. In one embodiment, the spacer height (TSH) of the spacer 46 is measured, as is illustrated. In one embodiment, the TSH may be used to select the spacer 46. In another embodiment, the spacer diameter (TSD) of the spacer 46 is measured, as is illustrated. In one embodiment, the TSD may be used to select the spacer 46. For example, in one embodiment, if the TSD of the spacer 46 is larger than 0.745 inches, a different spacer 46 may be selected for use in the pump system 10. In another embodiment, the spacer inner diameter (TSID) of the spacer 46 is measured, as is illustrated. In one embodiment, the TSID may be used to select the spacer 46.

Figure 8A:
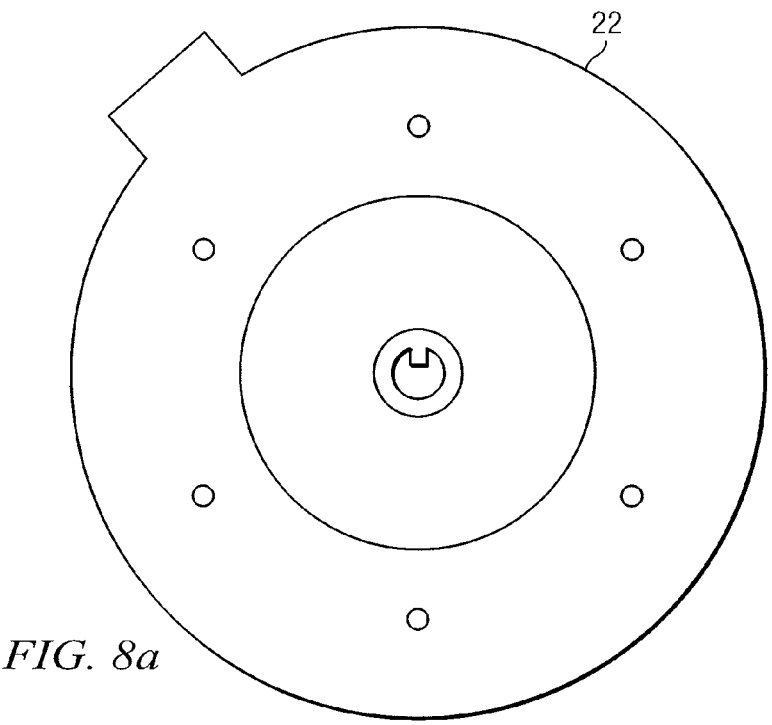
Figure 8B:
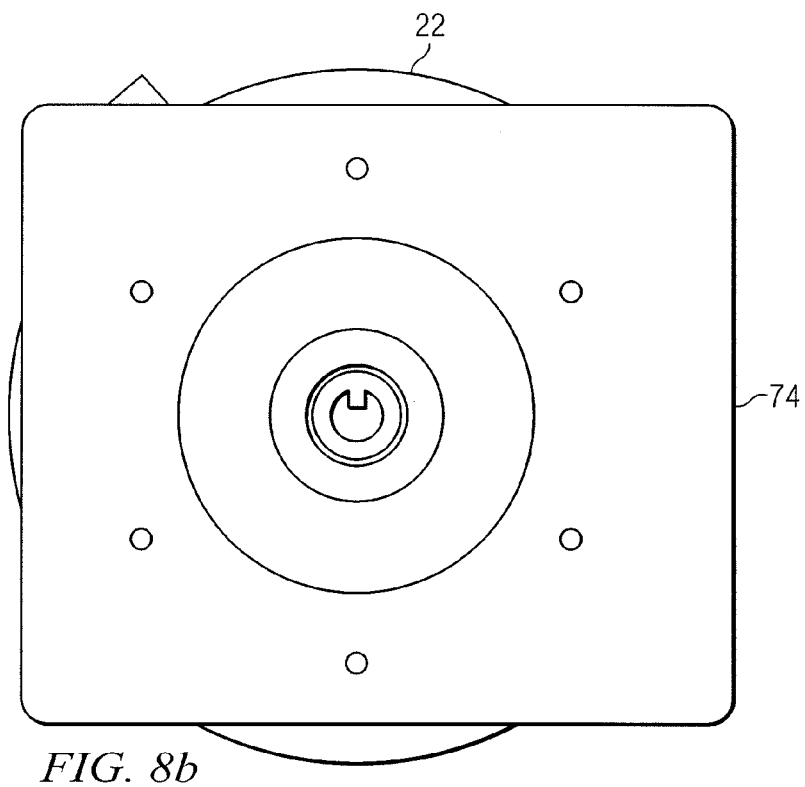

FIGS. 8A and 8B illustrate particular embodiments for installing the spacer 46 around the motor shaft 22. In one embodiment, installing the spacer 46 around the motor shaft 22 may include installing a connector 74. In a further embodiment, the housing 30 may be installed on the motor 14, with or without the first shim 18, before the spacer 46 is installed on the motor shaft 22.

FIG. 9 illustrates particular embodiments for calculating the size and location of the second shim 34. In one embodiment, the shaft shoulder height (SSH) between the housing 30 and the spacer 46 is measured, as is illustrated. In one embodiment, the SSH may be used to calculate the size of the second shim 34, as is described below. In one embodiment, the measurement of SSH is made before the second shim 34 is installed in the pump system 10. In a further embodiment, the size of the second shim 34 is calculated. In one embodiment, the size of the second shim 34 may be calculated using the USH of FIG. 4B and the SSH described above. In one embodiment, the size of the second shim 34 may be calculated using the following formula:

Second shim 34=(USH−SSH)−0.050 inches

The calculation of the size of the second shim 34 may result in a positive number or a negative number. In one embodiment, if the calculation of the size of the second shim 34 results in a positive number, the second shim 43 may be installed in-between the spacer 46 and the shoulder 44 of the motor shaft 22. In such an embodiment, the spacer 46 may be removed from the motor shaft 22 prior to the installation of the second shim 34. In one embodiment, if the calculation of the size of the second shim 34 results in a positive number, the positive number is the size of the second shim 34 to be used in the pump system 10. In a further embodiment, if the calculation for the size of the second shim 34 results in a negative number, the second shim 34 may be installed in-between the first seal 38 and the housing 30. In one embodiment, if the calculation of the size of the second shim 34 results in a negative number, a positive version of that negative result may be used as the size of the second shim 34.

In one embodiment, the first high temperature o-ring 42 and the housing 30 may be installed around the motor shaft 22 prior to each of the second shim 34, the first seal 38, and the spacer 46 being installed in the pump system 10. In one embodiment, after the first seal 38 is installed in the pump system 10, the housing 30 may be removed from the pump system 10 in order to verify that the first seal 38 is bottomed out.

Figure 10:
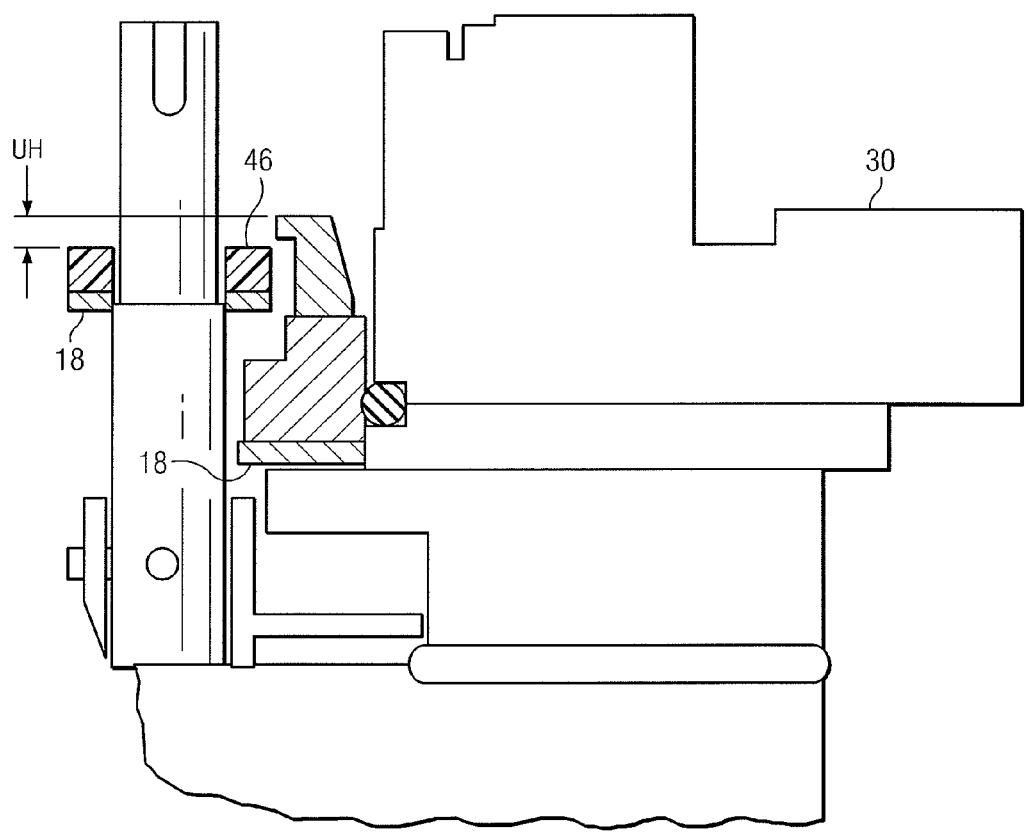

FIG. 10 illustrates particular embodiments for determining whether the calculated size of the second shim 34 is correct. In one embodiment, the unloaded height (UH) between the spacer 46 and the first seal 38 is measured, as is illustrated. In one embodiment, if the UH is 0.05 inches, the calculated size of the second shim 34 may be correct. In one embodiment, the UH may have a tolerance of +0.010 inches and −0.005 inches. In one embodiment, the calculated size of the second shim 34 may be correct if the UH falls within this tolerance.

Figure 11:
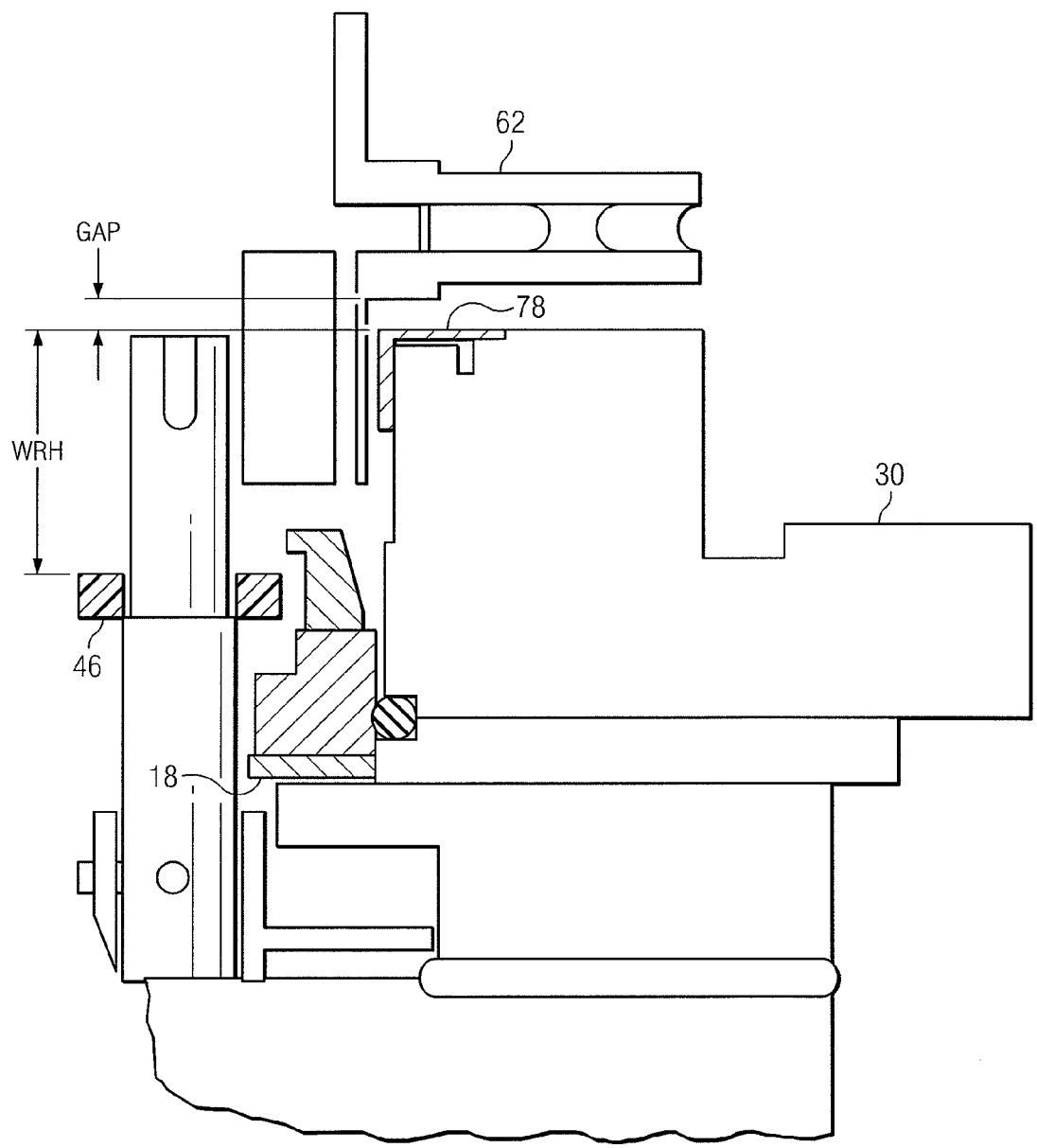

FIG. 11 illustrates particular embodiments for measuring the total height (TH) between the spacer 46 and the impeller 62. In one embodiment, a wear ring 78 may be installed on the housing 30 in-between the housing 30 and the impeller 62. In one embodiment, the wear ring 78 may include any suitable device for preventing wear of the housing 30 and/or the impeller 62. In one embodiment, the wear ring 78 may include any suitable wear ring for use in a CLET pump for a radar system for a Patriot missile system. In another embodiment, the wear ring 78 may include any other suitable wear ring. For example, the wear ring 78 may be a wear ring for a pump that provides coolants to an automobile engine, an oil rig motor, or any other suitable device that generates heat.

In one embodiment, the wear ring height (WRH) between the spacer 46 and the wear ring 78 is measured, as is illustrated. In one embodiment, the WRH may be used to calculate the size of the third shim 58, as is illustrated in FIG. 12. In a further embodiment, the gap (Gap) between the wear ring 78 and the impeller 62 is measured, as is illustrated. In one embodiment, the Gap may be used to calculate the size of the third shim 58, as is illustrated in FIG. 12. In one embodiment, the Gap may be 0.020 inches. In one embodiment, the TH between the spacer 46 and the impeller 62 is calculated. In one embodiment, the TH may be calculated using the WRH discussed above, and the Gap discussed above. In one embodiment, the TH may be calculated using the following formula:

TH=WRH+Gap

FIG. 12 illustrates particular embodiments for calculating the size of the third shim 58. In one embodiment, the lower impeller shoulder height (LISH) of the impeller 62 is measured, as is illustrated. In one embodiment, the LISH may be used to calculate the size of the third shim 58, as is discussed below. In another embodiment, the face seal height (FSH) of the second seal 50 is measured, as is illustrated. In one embodiment, the FSH may be used to calculate the size of the third shim 58, as is discussed below.

In a further embodiment, the size of the third shim 58 is calculated. In one embodiment, the size of the third shim 58 is calculated using the LISH discussed above, the FSH discussed above, the Gap of FIG. 11, and the WRH of FIG. 11. In one embodiment, the size of the third shim 58 may be calculated using the following formula:

Third shim 58=Gap+WRH−(LISH+FSH)

In one embodiment, the third shim 58 may be selected for use in the pump system 10 if the actual size of the third shim 58 equals the calculated size of the third shim 58, plus or minus a tolerance. In one embodiment, the tolerance may be +0.010 inches and −0.000 inches. In a further embodiment, if the third shim 58 does not equal the calculated size of the third shim 58, plus or minus the tolerance, a third shim 58 that does meet this measurement may be selected.

FIG. 13 illustrates particular embodiments for preparing the impeller 62 for installation in the pump system 10. In one embodiment, the impeller 62 may already include a location pin. In such an embodiment, the location pin may be removed from the impeller 62 and replaced with a pin 82. In one embodiment, the pin 82 may include any suitable device that may be inserted into the impeller 62. For example, the pin 82 may include a case hardened 1/16 inch dowel pin. In one embodiment, the pin 82 may include any suitable pin for use in a CLET pump for a radar system for a Patriot missile system. In another embodiment, the pin 82 may include any other suitable pin. For example, the pin 82 may be a pin for a pump that provides coolants to an automobile engine, an oil rig motor, or any other suitable device that generates heat.

In one embodiment, the pin 82 may be installed in the impeller 62 between the setting fixture of the impeller 62 and the third shim 58. In one embodiment, after the pin 82 has been installed, the pin height (LPH) of the pin 82 may be measured, as is illustrated. In a further embodiment, once the pin 82 has been installed in the impeller 62, the impeller 62 and the wear ring 78 may be removed from the pump system 10.

FIG. 14A and FIG. 14B illustrate particular embodiments for selecting the second high temperature o-ring 54. In one embodiment, the upper o-ring cross-sectional diameter (UOCD) of the second high temperature o-ring 54 is measured, as is illustrated in FIG. 14A. In one embodiment, the UOCD may be used to select the second high temperature o-ring 54, as is discussed below. In another embodiment, the upper o-ring compression (UOC) is calculated. In one embodiment, the UOC is calculated using the UOCD described above, the FSOGD of FIG. 7A, and the MSD of FIG. 2. In one embodiment, the UOC may be calculated using the following formula:

UOC=UOCD−(FSOGD−MSD)/2

In one embodiment, the UOC may have a result within the range of 0.010 inches to 0.017 inches. In such an embodiment, the second high temperature o-ring 54 may be used in the pump system 10. In a further embodiment, if the UOC does not fall within the above range, a different second high temperature o-ring 54 may be selected in order to satisfy the above range for UOC.

In one embodiment, after the second high temperature o-ring 54 is selected, as is described above, the second seal 50 may be installed around the motor shaft 22 of the pump system 10. In one embodiment, a lubricant may be applied to the area of the second seal 50 that contacts the first seal 38, as is discussed in FIG. 1, prior to the second seal 50 being installed in the pump system 10. For example, the lubricant may be applied to an area of 0.010 inches through 0.030 of the second seal 50. After the second seal 50 is installed in the pump system 10, the second high temperature o-ring 54 may be installed in the pump system 10, and then the third shim 58 may be installed in the pump system 10. In one embodiment, a lubricant may be applied to the second high temperature o-ring 54, as is discussed in FIG. 1, prior to the second high temperature o-ring 54 being installed in the pump system 10. In a further embodiment, the wear ring 78, the impeller 62, and the mounting hardware 70 may then be installed in the pump system 10.

Figure 15A:
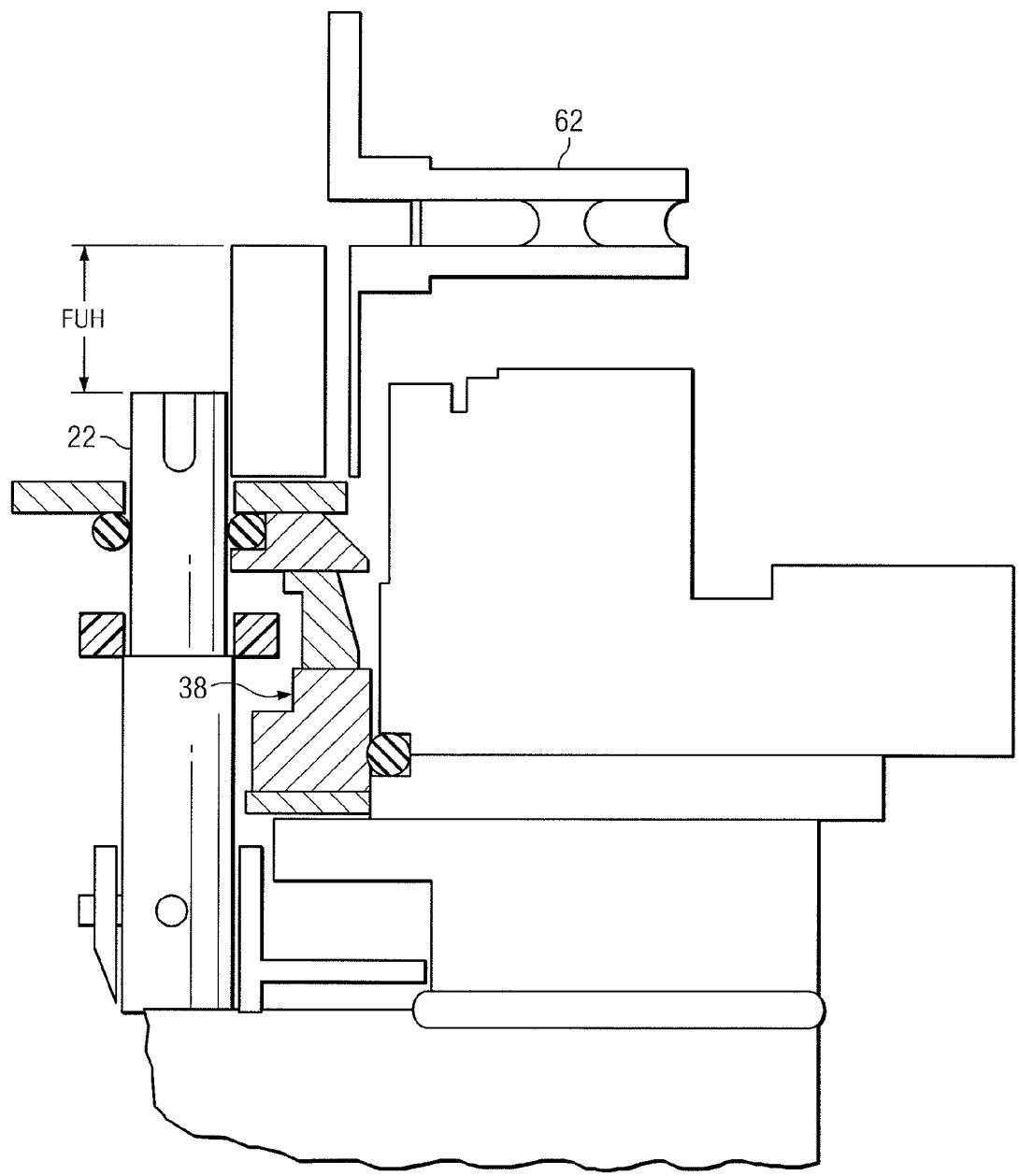
Figure 15B:
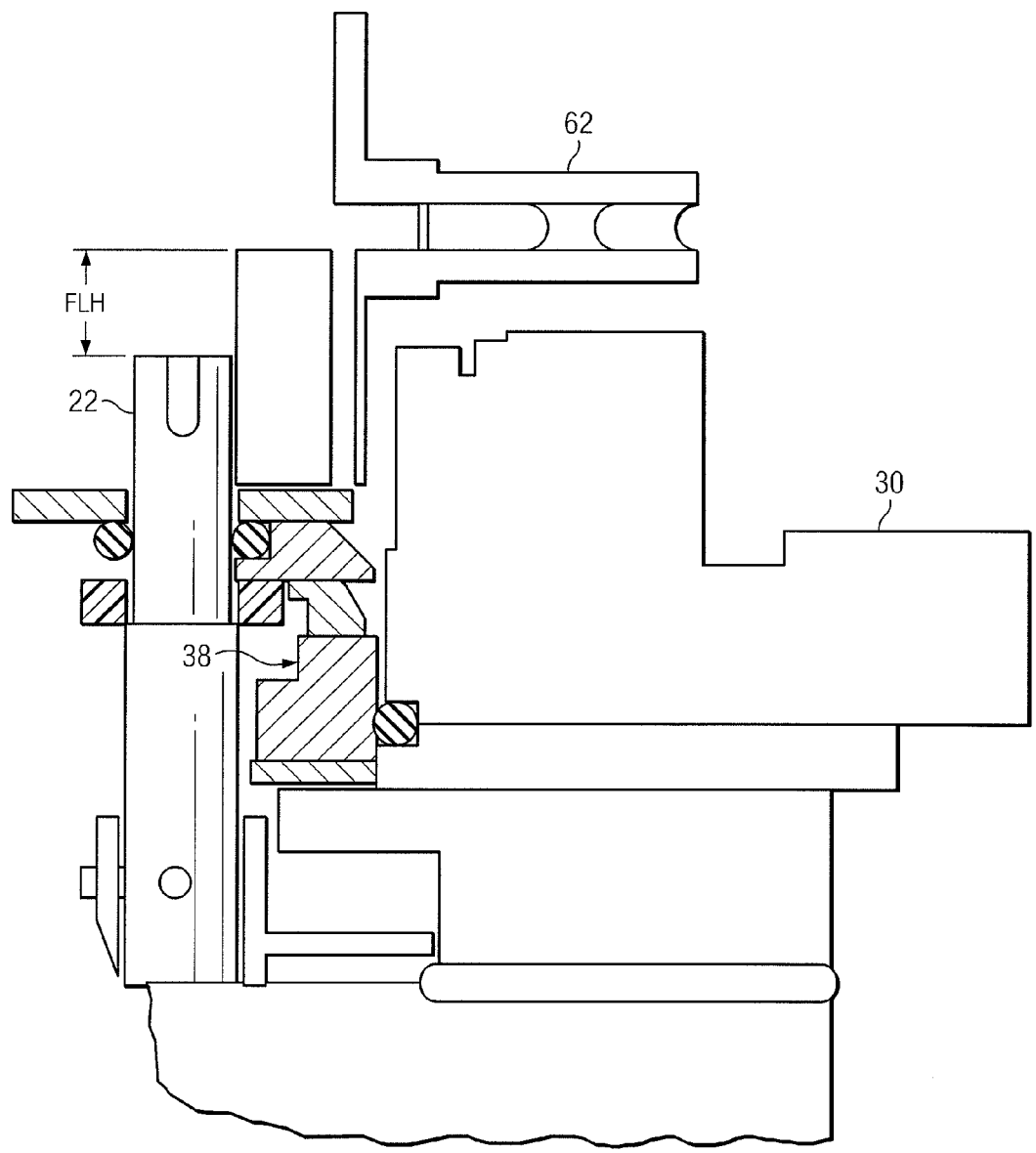

FIGS. 15A and 15B illustrate particular embodiments for calculating the size of the fourth shim 66. In one embodiment, the final unloaded height (FUH) between the motor shaft 22 and the impeller 62 may be measured, as is illustrated in FIG. 15A. In one embodiment, the FUH may be measured prior to preloading the pump system 10 by depressing the impeller 62 (and causing the first seal 38 to contract), as is discussed in FIG. 1. In a further embodiment, after the FUH has been measured, the impeller 62 may be depressed in order to preload the second seal 50 and the first seal 38 of the pump system 10. According to one embodiment, once the pump system 10 is preloaded, the final loaded height (FLH) between the motor shaft 22 and the depressed impeller 62 is measured, as is illustrated. In one embodiment, the FLH may be used to calculate the size of the fourth shim 66, as is described below. In a further embodiment, a preload (Preload) may be calculated. In one embodiment, the Preload may be calculated using the FUH described above and the FLH described above. In one embodiment, the Preload may be calculated using the following formula:

Preload=FUH−FLH

According to one embodiment, the size of the fourth shim 66 may then be calculated. In one embodiment, the size of the fourth shim 66 may be calculated using the FLH discussed above. In one embodiment, the size of the fourth shim 66 may be calculated using the following formula:

Fourth shim 66=FLH−0.005 inches

In one embodiment, the result of this calculation may be the size of the fourth shim 66 that is installed in the pump system 10. In one embodiment, the mounting hardware 70 and the impeller 62 are removed in order to install the fourth shim 66. In a further embodiment, once the fourth shim 66 is installed, the impeller 62 and the mounting hardware 70 may be re-installed on the pump system 10. In one embodiment, installing the mounting hardware 70 may further include installing a key into the motor shaft 22.

Figure 16:
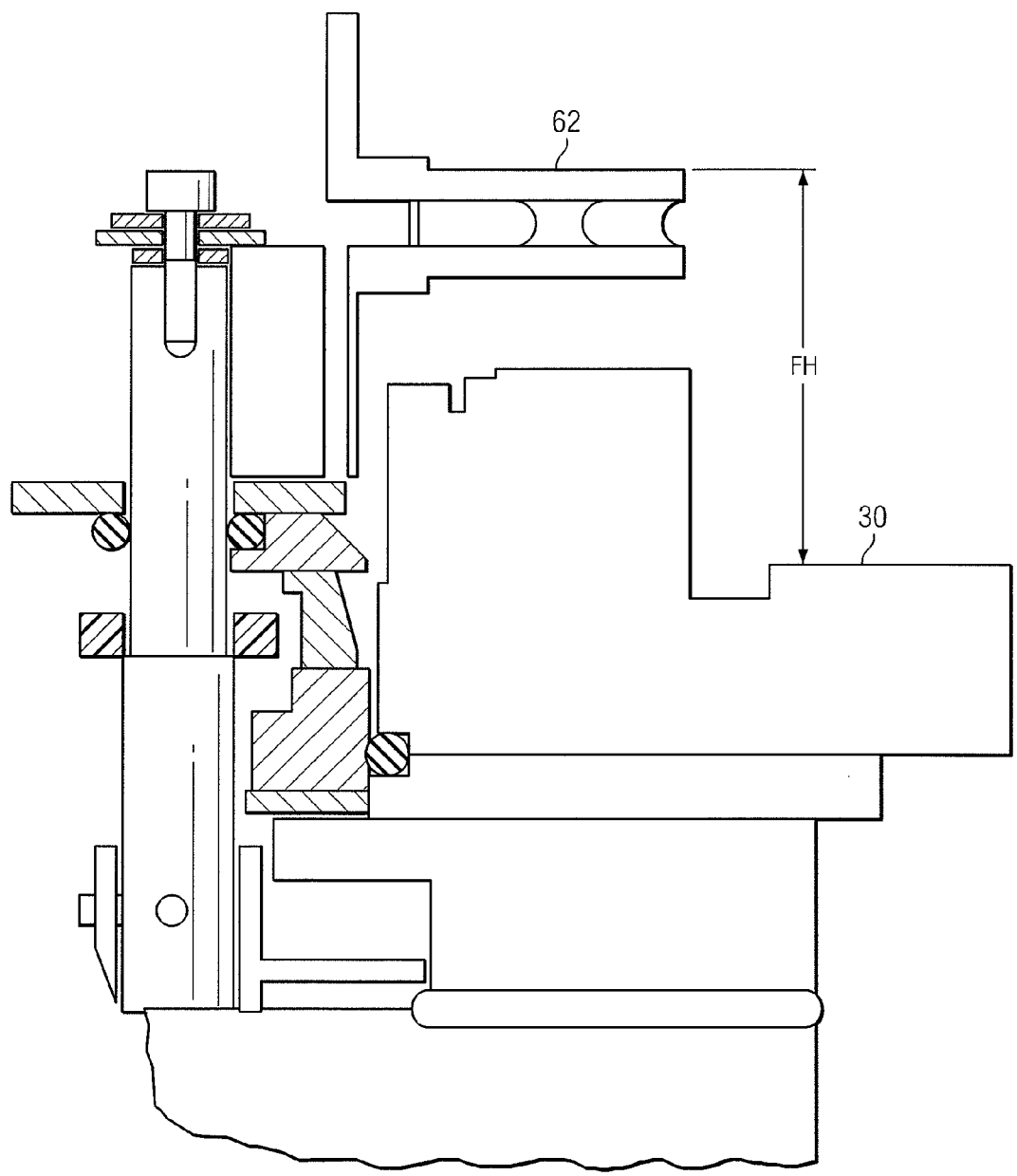

FIG. 16 illustrates particular embodiments for measuring the pump system 10 prior to installing the pump system 10 in the pump manifold well. In one embodiment, the final height (FH) between the housing 30 and the impeller 62 is measured, as is illustrated. In one embodiment, the FH may be recorded on the pump system 10 in order to save the FH for later use. As such, the measurements and calculations made in FIGS. 2-16 may not need to be made again. In one embodiment, the compatible pump manifold well (CPMW) of the pump system 10 may be calculated. In one embodiment, the CPMW may be calculated using the FH discussed above. In one embodiment, the CPMW may be calculated using the following formula:

CPMW=FH+0.020 inches

Figure 17:
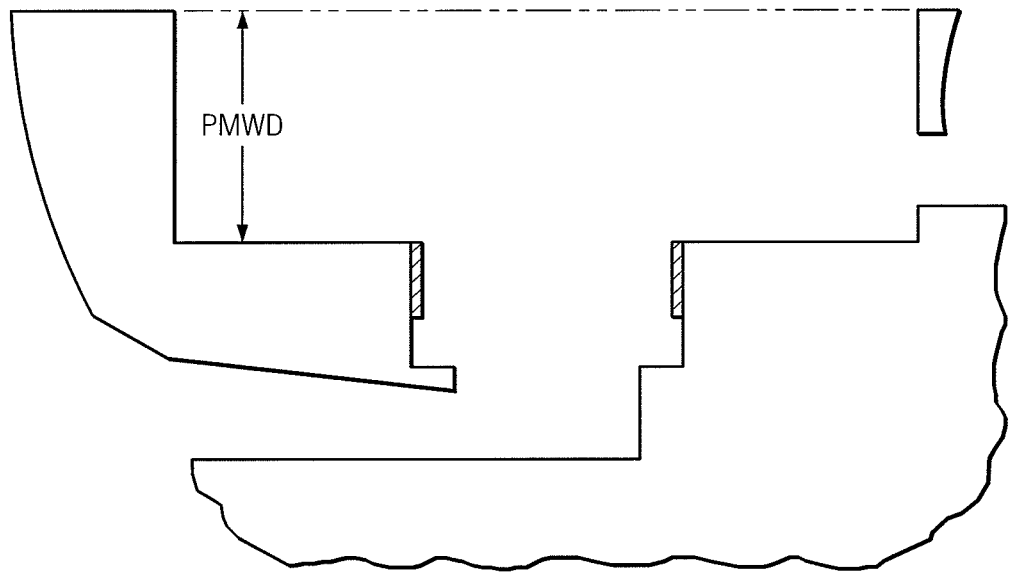

FIG. 17 illustrates particular embodiments for measuring the pump manifold well depth. In one embodiment, the pump manifold well includes a space where the pump system 10 may be installed into. For example, after the pump system 10 is completely built, or re-built, (as is illustrated in FIGS. 2-16) the pump system 10 may be inverted and installed into the pump manifold well. In one embodiment, the pump manifold well may further include a quantity of coolant. As such, once the pump system 10 is installed in the pump manifold well, the pump system 10 may pump the coolant into the housing 30 in order to provide the coolant to another system, such as a radar system of a Patriot missile system.

In one embodiment, the pump manifold well depth (PMWD) of the pump manifold well may be measured, as is illustrated. In one embodiment, the PMWD may be greater than or equal to the CPMW (discussed in FIG. 16). In such an embodiment, the pump system 10 may be installed in the pump manifold well. In another embodiment, if the PMWD is less than the CPMW, the pump system 10 may not be installed into the pump manifold well. In such an embodiment, the pump system 10 may be installed into another pump manifold well that meets the criteria above.

Figure 18:
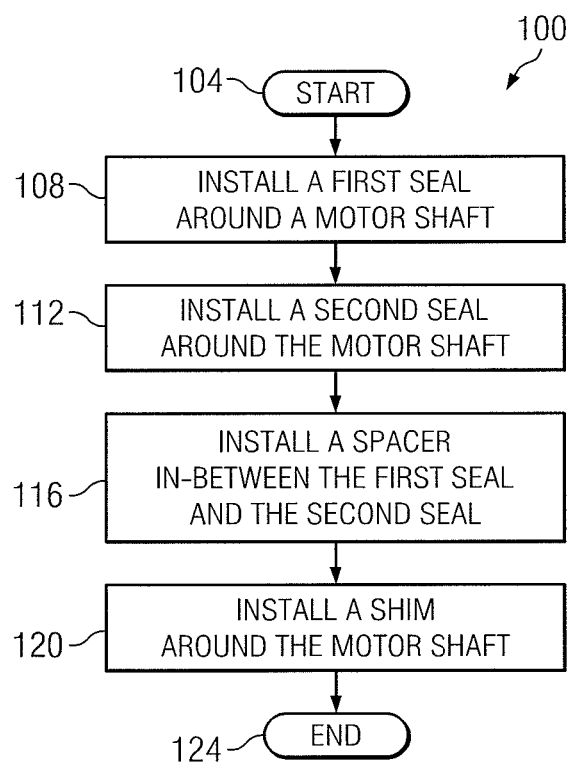
FIG. 18 illustrates one embodiment of a method for re-building one embodiment of the pump system of FIG. 1.

FIG. 18 illustrates one embodiment of a method 100 for re-building one embodiment of the pump system 10. Although method 100 illustrates a method for re-building one embodiment of the pump system 10, further embodiments of the method 100 may include building one embodiment of the pump system 10. At step 104, the method begins. At step 108, a first seal is installed around a motor shaft. In one embodiment, the motor shaft may include a motor shaft of a cooling liquid electron tube pump. In a further embodiment, the motor shaft may include a motor shaft of a cooling liquid electron tube pump for a radar system for a Patriot missile system. In a further embodiment, the first seal may include any suitable seal that may form a hydrodynamic seal with a second seal when the motor shaft rotates.

At step 112, a second seal is installed around the motor shaft. In one embodiment, the second seal may include any suitable seal that may form a hydrodynamic seal with the first seal when the motor shaft rotates. In a further embodiment, installing a second seal around the motor shaft may include applying an amount of lubricant to the second seal in an area of the second seal that contacts the first seal. In one embodiment, the lubricant may include molybdenum grease. In a further embodiment, after the lubricant is applied to the second seal, the second seal may be installed around the motor shaft.

At step 116, a spacer is installed in-between the first seal and the second seal. In one embodiment, the spacer may include any suitable device for dampening vibrations emanating from the motor shaft as it rotates. As such, in one embodiment, the spacer may allow the second seal to form a better hydrodynamic seal with the first seal. As such, coolant leakage may be minimized.

At step 120, a shim is installed around the motor shaft. In one embodiment, one or more shims may be installed around the motor shaft. For example, a first shim may be installed around the motor shaft in a location in-between a motor coupled to the motor shaft and a housing surrounding the motor shaft. As another example, a second shim may be installed around the motor shaft in a location either in-between the first seal and a housing surrounding the motor shaft or in-between the spacer and a shoulder of the motor shaft. In such an example, the size of the second shim may be based on at least a height of the first seal. For example, the size of the second shim may be calculated as is illustrated in FIG. 9. As a further example, a third shim may be installed around the motor shaft in a location in-between the second seal and an impeller installed around the motor shaft. In such an example, the size of the third shim may be calculated, as is illustrated in FIG. 12. As another example, a fourth shim may be installed around the motor shaft in a location in-between the impeller and mounting hardware installed on the motor shaft.

In a further embodiment, a first high temperature o-ring may be installed around the motor shaft in a location in-between the first seal and a housing surrounding the motor shaft. In another embodiment, a second high temperature o-ring may be installed around the motor shaft in a location in-between the second seal and at least a third shim installed above the second seal. The method ends at step 124.

The steps illustrated in FIG. 18 may be combined, modified, or deleted where appropriate. Additional steps may also be added to the example operation. Furthermore, the described steps may be performed in any suitable order.

Although the present disclosure has been described in several embodiments, a myriad of changes, substitutions, and modifications may be suggested to one skilled in the art, and it is intended that the present disclosure encompass such changes, substitutions, and modifications as fall within the scope of the present appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A method, operable in system comprising a motor shaft, first seal, second seal, and spacer, the method comprising the unordered steps of:
    installing the first seal around the motor shaft, the first seal having a respective top surface, bottom surface, outer surface, and inner surface, wherein the top surface of the first seal is disposed at a first axial position relative to a vertical axis of the motor shaft, the bottom surface of the first seal is disposed at a second axial position relative to the vertical axis, and wherein the inner surface of the first seal opposes and is spaced apart from an outer surface of the motor shaft;
    installing the second seal around the motor shaft, the second seal having a respective top surface, bottom surface, outer surface, and inner surface, the second seal configured to be rotatable around the motor shaft about the vertical axis when the motor shaft rotates, wherein the top surface of the second seal is disposed at a third axial position relative to the vertical axis, and the bottom surface of the second seal is disposed at a fourth axial position relative to the vertical axis;
    selecting the second and third axial positions to enable at least a portion of the top surface of the second seal and at least a portion of the bottom surface of the first seal to have contact sufficient to form a hydrodynamic seal between the first and second seals when the motor shaft rotates, wherein the second and third axial positions are also selected to define a radial gap between at least a portion of the inner surface of the first seal, at least a portion of the top surface of the second seal, and at least a portion of the outer surface of the motor shaft, the radial gap defining a volume of space that is devoid of elements of the system, apart from the spacer, and which is enclosed at least partially by the inner surface of the first seal, the top surface of the second seal, and the outer surface of the shaft;
    installing the spacer around the motor shaft, wherein the spacer is disposed within the radial gap, the spacer having an interior spacer surface that is disposed adjacent to the outer surface of the motor shaft, and an exterior spacer surface, the exterior spacer surface comprising a respective top surface, bottom surface, and outer surface of the spacer, wherein the top surface of the spacer is disposed at a fifth axial position located between the first and third axial positions, relative to the vertical axis, and the bottom surface of the spacer is disposed at a sixth axial position located between the first and third axial positions, relative to the vertical axis;
    constructing and arranging the spacer so that the interior spacer surface opposes the outer surface of the motor shaft, the exterior spacer surface is spaced apart from the inner surface of the first seal and apart from the top surface of the second seal, and wherein the spacer is disposed in a portion of the radial gap that is devoid of any other elements of the system other than the spacer, wherein the exterior pacer surface is not in contact with or disposed adjacent to any elements of the system other than the motor shaft; and
    wherein the spacer, when installed, substantially dampens vibrations from the motor shaft while the motor shaft is being rotated.

2. The method of claim 1, further comprising installing at least a first shim around the motor shaft in a first shim location that is disposed in-between a motor coupled to the motor shaft and a housing surrounding the motor shaft, wherein the motor shaft has a height and wherein the first shim is configured and positioned to adjust an axial location of the housing, relative to the vertical axis, to compensate for a variation in the height of the motor shaft.

3. The method of claim 1, wherein the system further comprises a pump system in operable communication with the shaft, the method further comprising the unordered steps of:
    determining a size of at least a second shim based at least in part on at least one of a height of the first seal, a height of the spacer, and a height of the pump system; and
    based on at least one of the height of the first seal, the height of the spacer, and the height of the pump system, installing the second shim around the motor shaft at a second shim location selected from one of the following two locations:
    (a) in-between the top surface of the first seal and an inner surface of a housing surrounding the motor shaft, wherein the second shim is configured and positioned to vertically displace the first seal relative to the spacer; or
    (b) in between the top surface of the spacer and a shoulder of the motor shaft that opposes at least a portion of the top surface of the spacer, wherein the second shim is configured and positioned to vertically displace the spacer relative to the first seal; and
    selecting the size of the second shim and the second shim location to ensure that the first and second seals form a hydrodynamic seal when the motor shaft rotates.

4. The method of claim 1, wherein the system further comprises a pump system in operable communication with the shaft, and wherein the method further comprises the unordered step of installing a third shim around the motor shaft in a third shim location in-between the bottom surface of the second seal and an impeller installed around the motor shaft, wherein the third shim is configured and positioned to adjust the vertical position of the impeller, relative to the vertical axis, to compensate for at least one variation in a height of the pump system.

5. The method of claim 1, further comprising the unordered steps of:
    installing a first high temperature o-ring around the motor shaft in-between the outer surface of the first seal and a housing surrounding the motor shaft; and
    installing a second high temperature o-ring around the motor shaft in-between the inner surface of the second seal and at least a third shim, wherein the at least the third shim is installed around the motor shaft in a seventh axial location that is disposed in-between the bottom surface of the second seal and an impeller installed around the motor shaft.

6. The method of claim 1, wherein the outer surface of the motor shaft comprises a shoulder and further comprising the unordered step of selecting the fifth axial position to enable the top surface of the spacer to be disposed adjacent to the shoulder of the motor shaft.

7. The method of claim 1, wherein the first seal further comprises a contractible portion adjacent to its bottom surface, the contractible portion configured to contract, when the system is loaded, to maintain the hydrodynamic seal with the second seal.

8. A system, comprising:
    a motor shaft coupled to a motor, the motor shaft having a respective outer surface and a vertical axis, wherein the motor shaft is operable to rotate about the vertical axis;
    a first seal coupled around the motor shaft, the first seal having a respective top surface, bottom surface, outer surface, and inner surface, wherein the top surface of the first seal is disposed at a first axial position relative to the vertical axis, the bottom surface of the first seal is disposed at a second axial position relative to the vertical axis, and wherein the inner surface of the first seal opposes and is spaced apart from the outer surface of the motor shaft;
    a second seal coupled around the motor shaft, the second seal having a respective top surface, bottom surface, outer surface, and inner surface, the second seal configured to be rotatable around the motor shaft about the vertical axis when the motor shaft rotates, wherein the top surface of the second seal is disposed at a third axial position relative to the vertical axis, the bottom surface of the second seal is disposed at a fourth axial position relative to the vertical axis, and wherein the second and third axial positions are selected to enable at least a portion of the top surface of the second seal and at least a portion of the bottom surface of the first seal to have contact sufficient to form a hydrodynamic seal between the first and second seals when the motor shaft rotates;
    wherein the second and third axial positions of the first and second seals, respectively, are also selected to define a radial gap between at least a portion of the inner surface of the first seal, at least a portion of the top surface of the second seal, and at least a portion of the outer surface of the motor shaft, the radial gap comprising a volume of space in the system that is devoid of any other elements of the system other than a spacer, the radial gap being enclosed at least partially by the inner surface of the first seal, the top surface of the second seal, and the outer surface of the shaft;
    the spacer disposed within the radial gap and coupled around the motor shaft, the spacer having an interior spacer surface that is disposed adjacent to the outer surface of the motor shaft, and an exterior spacer surface, the exterior spacer surface comprising a respective top surface, bottom surface, and outer surface of the spacer, wherein the top surface of the spacer is disposed at a fifth axial position located between the first and third axial positions, relative to the vertical axis, and the bottom surface of the spacer is disposed at a sixth axial position located between the first and third axial positions, relative to the vertical axis;
    wherein the spacer is constructed and arranged so that the interior spacer surface opposes the outer surface of the motor shaft, the exterior spacer surface is spaced apart from the inner surface of the first seal and the top surface of the second seal, and wherein the spacer is arranged in a portion of the radial gap that is devoid of any other elements of the system other than the spacer, wherein the exterior spacer surface is not in contact with or disposed adjacent to any elements of the system other than the motor shaft; and
    wherein the spacer, when installed, substantially dampens vibrations from the motor shaft while the motor shaft is being rotated.

9. The system of claim 8, further comprising at least a first shim coupled around the motor shaft in a location that is disposed in-between the motor and a housing surrounding the motor shaft, wherein the motor shaft has a height and wherein the first shim is configured and positioned to adjust an axial location of the housing, relative to the vertical axis, to compensate for a variation in the height of the motor shaft.

10. The system of claim 8, further comprising a second shim coupled around the motor shaft at a second shim location, the second shim having a size based at least in part on at least one of a height of the first seal, a height of the spacer, and the height of the system, wherein the second shim location is selected from one of the following two locations:
    (a) in-between the top surface of the first seal and an inner surface of a housing surrounding the motor shaft, wherein the second shim is configured and positioned to vertically displace the first seal relative to the spacer; or
    (b) in-between the top surface of the spacer and a shoulder of the motor shaft that opposes at least a portion of the top surface of the spacer, wherein the second shim is configured and positioned to vertically displace the spacer relative to the first seal, and wherein the size of the second shim and the second shim location are selected to ensure that the first and second seals are able to form a hydrodynamic seal when the motor shaft rotates.

11. The system of claim 8, further comprising a third shim coupled around the motor shaft in a third shim location in-between the bottom surface of the second seal and an impeller coupled around the motor shaft, wherein the third shim is configured and positioned to adjust the vertical position of the impeller, relative to the vertical axis, to compensate for at least one variation in a height of the system.

12. The system of claim 8, further comprising:
    a first high temperature o-ring coupled around the motor shaft in between the outer surface of the first seal and a housing surrounding the motor shaft; and
    a second high temperature o-ring coupled around the motor shaft in-between the inner surface of the second seal and at least a third shim, wherein the at least the third shim is coupled around the motor shaft in a seventh axial location that is disposed in-between the bottom surface of the second seal and an impeller coupled around the motor shaft.

13. The system of claim 8, wherein the first seal further comprises a contractible portion adjacent to its bottom surface, the contractible portion configured to contract, when the system is loaded, to maintain the hydrodynamic seal between the first and second seals.

14. The system of claim 8, wherein the outer surface of the motor shaft comprises a shoulder portion and wherein the fifth axial position is selected to enable the top surface of the spacer to be disposed adjacent to the shoulder of the motor shaft.

15. The system of claim 8, further comprising a fourth shim coupled around the motor shaft and disposed in between a bottom surface of the motor shaft and a top surface of mounting hardware that couples an impeller to the motor shaft, wherein the fourth shim is configured and arranged to preload the first and second seals to increase the hydrodynamic seal.

16. The system of claim 8, further comprising a fourth shim coupled around the motor shaft and disposed in between a bottom surface of the motor shaft and a top surface of mounting hardware that couples an impeller to the motor shaft, wherein the fourth shim is configured and arranged to alter the vertical location of the impeller, relative to the motor shaft.

17. A system, comprising:
a motor shaft coupled to a motor along a portion of at least a first surface of the motor, the motor shaft having a respective outer surface, and a vertical axis, wherein the motor shaft is operable to rotate about the vertical axis;
a first seal coupled around the motor shaft, the first seal having a respective top surface, bottom surface, outer surface, and inner surface, wherein the top surface of the first seal is disposed at a first axial position relative to the axis of the motor shaft and the bottom surface of the first seal is disposed at a second axial position relative to the axis of the motor shaft, and wherein the inner surface of the first seal opposes and is spaced apart from the outer surface of the motor shaft to define a first side boundary of a radial gap formed therebetween, with the outer surface of the motor shaft defining a second side boundary of the radial gap, and the first surface of the motor defining a top boundary of the radial gap;
a second seal coupled to be rotatable around the motor shaft, the second seal having a top surface positioned at a third axial location relative to the vertical axis, the second seal further having a respective bottom surface, outer surface, and inner surface, wherein the inner surface of the second seal is disposed adjacent to the outer surface of motor shaft, wherein the second and third axial locations are selected to enable at least a first portion of the top surface of the second seal and at least a portion of the bottom surface of the first seal to have contact sufficient to form a hydrodynamic seal between the first and second seals when the motor shaft rotates, and wherein at least a second portion of the top surface of the second seal extends from the inner surface of the first seal to the outer surface of the motor shaft to define a lower boundary of the radial gap;
a spacer disposed within the radial gap and coupled around the motor shaft, the spacer having an interior spacer surface disposed adjacent to the outer surface of the motor shaft and an exterior spacer surface that is spaced apart from the first and second seals, the exterior spacer surface comprising a respective top surface, bottom surface, and outer surface of the spacer, wherein the top surface of the spacer is disposed at a fourth axial position, relative to the vertical axis of the motor shaft, the fourth axial position being located in between the first and third axial positions,
wherein the radial gap comprises a volume of space in the system defined by the first side boundary, the second side boundary, the top boundary, and the lower boundary of the radial gap, and wherein the spacer is arranged in a portion of the radial gap that is devoid of any other elements of the system other than the spacer, wherein the exterior spacer surface is not in contact with or disposed adjacent to any elements of the system other than the motor shaft; and
wherein the spacer is constructed and arranged to dampen vibrations from the motor shaft while the motor shaft is being rotated.

18. The system of claim 17, wherein the second seal is configured to be rotatable at high speeds around the motor shaft, about the vertical axis, when the motor shaft rotates.

19. The system of claim 17, further comprising:
a housing coupled between the first surface of the motor and the top surface of the first seal, the housing having a respective height and comprising an exterior surface, a top surface, a bottom surface, and an inner surface, wherein the top surface of the housing is disposed adjacent at least a portion of the first surface of the motor, wherein the housing is constructed and arranged to receive therein coolant used to cool the system, the coolant pumped into the housing by a pump system coupled to the motor; and
at least one shim having a size selected to compensate for a variation in height of at least one of the housing, motor, pump system, first seal, and second seal, wherein the at least one shim is positioned in one of the following locations:
(a) in between the top surface of the first seal and the inner surface of the housing; and
(b) in between the top surface of the housing and the first surface of the motor;
wherein the at least one shim is constructed and arranged to help to maintain the hydrodynamic seal between the first and second seals.

20. The system of claim 17, further comprising:
a housing coupled between the first surface of the motor and the top surface of the first seal, the housing comprising an exterior surface, a top surface, and an inner surface, wherein the housing is constructed and arranged to receive therein coolant used to cool the system, the coolant pumped into the housing by the motor, wherein at least a portion of the top surface of the housing is coupled to the bottom surface of the motor, the inner surface of the housing is configured to be spaced apart from the outer surface of the motor shaft, and at least a portion of the inner surface of the housing is disposed between at least a portion of the top surface of the first seal and at least a portion of the bottom surface of the motor, so that the at least portion of the inner surface of the housing forms a further boundary portion of the radial gap; and
a leakage shaft formed in the housing, the leakage shaft having a first opening disposed along the portion of the inner surface of the housing that forms a further boundary portion of the radial gap, and a second opening disposed the outer surface of the housing;
wherein the leakage shaft is constructed and arranged to allow coolant that leaks past the first seal to enter the first opening and exit through the second opening, causing the coolant to exit the housing prior to coming in contact with the motor.

\* \* \* \* \*